United States Patent
Taylor et al.

(10) Patent No.: US 12,452,188 B2
(45) Date of Patent: Oct. 21, 2025

(54) SYSTEMS AND METHODS FOR MANAGING MESSAGE QUEUING

(71) Applicant: Pushnami LLC, Austin, TX (US)

(72) Inventors: Mitchell Taylor, Austin, TX (US); Emerson Smith, Austin, TX (US)

(73) Assignee: Pushnami LLC, Austin, TX (US)

( * ) Notice: Subject to any disclaimer, the term of this patent is extended or adjusted under 35 U.S.C. 154(b) by 0 days.

(21) Appl. No.: 18/520,902

(22) Filed: Nov. 28, 2023

(65) Prior Publication Data
US 2024/0179102 A1 May 30, 2024

Related U.S. Application Data

(60) Provisional application No. 63/428,545, filed on Nov. 29, 2022.

(51) Int. Cl.
*H04L 47/625* (2022.01)

(52) U.S. Cl.
CPC .................. *H04L 47/6255* (2013.01)

(58) Field of Classification Search
CPC .................................................. H04L 47/6255
See application file for complete search history.

(56) References Cited

U.S. PATENT DOCUMENTS

| | | | | |
|---|---|---|---|---|
| 8,196,150 B2 * | 6/2012 | Downing | ............... | G06F 9/544 |
| | | | | 719/314 |
| 8,621,074 B2 * | 12/2013 | Shikari | ............... | H04L 67/1001 |
| | | | | 710/33 |
| 9,250,968 B2 * | 2/2016 | Sihn | ............... | G06F 9/5027 |
| 9,298,508 B2 * | 3/2016 | Bird | ............... | G06F 9/5038 |
| 9,436,532 B1 * | 9/2016 | Chandrasekaran | ..... | G06F 9/546 |
| 9,811,346 B2 * | 11/2017 | Manchineni | ............... | G06F 9/4411 |
| 9,847,950 B1 * | 12/2017 | Markevics | ............... | H04L 47/6225 |
| 2006/0101469 A1 * | 5/2006 | Hathorn | ............... | G06F 9/5016 |
| | | | | 718/104 |
| 2007/0101341 A1 * | 5/2007 | Downing | ............... | G06F 9/542 |
| | | | | 719/314 |
| 2013/0290984 A1 * | 10/2013 | Denio | ............... | G06F 9/546 |
| | | | | 719/314 |
| 2013/0304826 A1 * | 11/2013 | Li | ............... | H04L 51/214 |
| | | | | 709/206 |

(Continued)

FOREIGN PATENT DOCUMENTS

| CN | 105516265 A | * | 4/2016 |
|---|---|---|---|
| CN | 112799608 A | * | 5/2021 |

*Primary Examiner* — Oanh Duong
(74) *Attorney, Agent, or Firm* — Sprinkle IP Law Group

(57) ABSTRACT

Improved messaging systems are disclosed. Embodiments allow message producers to access or create producer reservations in a queue coordination data store corresponding to a campaign. The producer reservations reflect a workload and a campaign aspect. A message producer can apply a usage strategy in resource selection which may optimize selection of queueing resources considering existing work volume for those message queues or aspects of the campaign. Message consumers may select message queues from which to consume messages using data in the queue coordination data store. A message consumer may apply a usage strategy in resource selection which may optimize selection of queueing resources considering existing work volume for those message queues or aspects of the campaign.

21 Claims, 6 Drawing Sheets

(56) References Cited

U.S. PATENT DOCUMENTS

| | | | | |
|---|---|---|---|---|
| 2014/0040401 | A1* | 2/2014 | Banks | H04L 51/52 |
| | | | | 709/206 |
| 2015/0058404 | A1* | 2/2015 | Agrawal | H04L 67/1008 |
| | | | | 709/203 |
| 2015/0127769 | A1* | 5/2015 | Word | H04L 47/564 |
| | | | | 709/217 |
| 2015/0163161 | A1* | 6/2015 | Arikatla | H04L 47/70 |
| | | | | 709/226 |
| 2017/0325271 | A1* | 11/2017 | Li | H04W 4/023 |
| 2019/0129771 | A1* | 5/2019 | Chen | G06F 12/0875 |
| 2020/0169616 | A1* | 5/2020 | Chen | H04L 67/55 |
| 2021/0226903 | A1* | 7/2021 | Kwong | H04L 49/9047 |
| 2021/0349640 | A1* | 11/2021 | Frolikov | G06F 3/0631 |
| 2022/0398141 | A1* | 12/2022 | Methvin | G06F 9/542 |
| 2023/0385137 | A1* | 11/2023 | Parkhi | G06F 9/505 |

\* cited by examiner

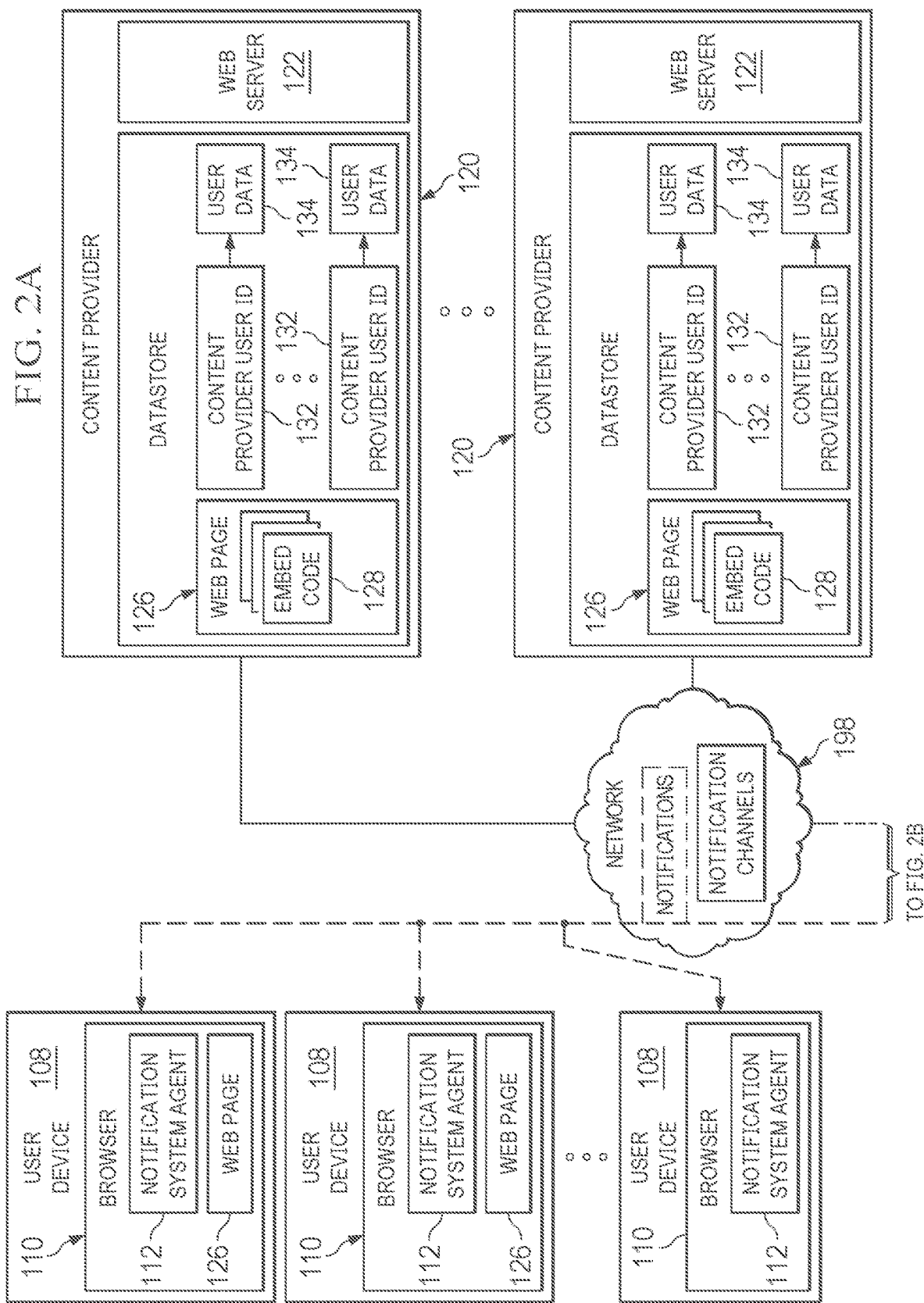

SYSTEMS AND METHODS FOR MANAGING MESSAGE QUEUING

RELATED APPLICATIONS

This application claims the benefit of priority under 35 U.S.C. § 119 to U.S. Provisional Application No. 63/428,545, entitled "SYSTEMS AND METHODS FOR MANAGING MESSAGE QUEUING", filed Nov. 29, 2022, which is hereby fully incorporated by reference herein for all purposes.

TECHNICAL FIELD

This disclosure relates generally to messaging systems. In particular, this disclosure relates to the management of message queueing. Specifically, this disclosure relates to the coordination of queues and the production and consumption of messages on these queues to improve messaging operations, including increasing notification throughput. Even more particularly, this disclosure relates to the management of such message queuing in the context of messaging for push based notifications.

BACKGROUND

Computer messaging systems enable computer processes to communicate across heterogeneous networks and systems in an asynchronous manner. As a consequence, as computing environments, and processes implemented thereon, have grown increasingly more distributed, internetworked, and heterogeneous, such computer messaging systems have likewise grown in importance. In many environments where computer messaging systems are deployed it is important that the messaging system be scalable and provide sufficient capabilities for coordinating and managing the queuing of messages to ensure that throughput remains high and service disruptions are avoided.

While certain architectures have been tried for high volume messaging systems, these architectures have proved inadequate in various contexts. One such inadequate architecture for a messaging platform is a shared queue pool whereby a single shared queue pool is utilized to queue and process all messages. While this approach may be used to achieve uniform throughput, it does not provide adequate separation of resources and does not preserve message ordering while also introducing a higher risk of system-wide service disruptions.

Another existing method of message processing in high volume messaging systems is called allocated queuing where queueing resources may be allocated individually to particular units or divisions within the messaging environment. For example, in a system of message processing where messages correspond to more than one unit (for example, a publisher) this could involve allocating one or more queues for each unit. While this approach isolates system-wide service disruptions it does not provide efficient throughput.

What is desired, therefore, are improved messaging systems that allow for the coordination and management of queues and the queuing and consumption of messages based on a wide variety of criteria.

SUMMARY

As discussed, improved messaging systems that allow for the coordination and management of queues and the queuing and consumption of messages are desired. Generally, these messaging systems provide a hardware or software infrastructure that provides for the sending of messages between the various hardware or software components in such a distributed computing environment. These messaging systems may thus be intended to handle a high volume of messages in a variety of contexts.

As can be imagined, given the size and scale of current computing environments, the number of messages generated and consumed in such an environment may be astronomical. Thus, it is important that the messaging system employed by such a computing system be scalable messaging systems adept at handling such a high volume of message and providing sophisticated capabilities for coordinating and managing the queuing of messages, including messages associated with the different accounts, websites, campaigns, etc. to ensure that throughput remains high and service disruptions are avoided.

Various messaging systems have heretofore proved inadequate. Typical systems which perform message processing usually do not coordinate production and consumption of messages in an optimal way and thus suffer from reduced throughput and a higher risk of service disruptions or backup.

Messaging systems, including improved high volume messaging systems that allow for the coordination and management of queues and the queuing and consumption of messages based on a wide variety of criteria, including tenants (e.g., accounts in a notification system), campaigns, websites, etc. are therefore desired. Accordingly, embodiments as disclosed may provide such messaging systems. These messaging systems may include a queue coordination data store to facilitate coordination among one or more message consumers and producers. The message consumers or producers may revise the data in the coordination data store (e.g., using a reconciliation job or the like) such message consumers and producers may utilize the queue coordination data store to determine which message queues to produce to or consume from.

Certain embodiments can therefore integrate with a message producer (associated with as executor) which maps scheduled executions (associated with campaigns) associated with a defined unit (e.g., a website) to individual unprocessed messages. Embodiments may estimate the size of the current execution and queries the coordination data store to determine if the current execution has an existing reservation for the defined unit (e.g., a website) associated with the campaign. If a reservation does not exist, a resource reservation is created on the data store for the campaign. If a reservation does exist, the existing reservation is updated.

Embodiments may also include a message consumer (referred to also as a worker) which obtains data from the same coordinating data store used by the message scheduler for existing reservations and selects one or more queues to consume from. The message consumer then processes messages from the selected queue(s). For example, this processing may involve sending a digital notification according to a message obtained from the selected queue.

In some cases, embodiments may allow the static reservation of queueing resources as configured in one or more data stores such that rules may be utilized to reserve processing bandwidth for particular units (e.g., accounts, websites, domains, etc.).

As such, in one embodiment a system may comprise a queue coordination data store, a message producer and a message consumer. The message producer may be adapted to execute a campaign by determining a workload associated with the campaign, determining a number of queues for the campaign, and reserving a first set of message queues for the campaign in the queue coordination data store. The first set of message queues can comprise the determined number of message queues for the campaign and the first set of message queues are reserved by creating a producer reservation in the queue coordination data store for each message queue of the first set of message queues. Each producer reservation for a message queue of the first set of message queues can include an association between an aspect of the campaign (e.g., a domain), an identifier for the message queue, and the workload. The message producer can then produce messages associated with the campaign to the first set of message queues.

An embodiment may also include a message consumer adapted to consume messages from the message queues of the messaging system by determining a consumer queue pool at an interval based on workloads associated with producer reservations in the queue coordination data store and reading messages from the queues identifier in this consumer queue pool. The consumer queue pool may comprise a second set of the message queues of the messaging system and the message consumer can reserve the second set of message queues by creating a consumer reservation in the queue coordination data store for each message queue of the second set of message queues. Each consumer reservation for each message queue of the second set of message queues can comprise an association between an identifier for the message consumer and the identifier for the message queue.

In some cases, the first set of message queues includes at least one message queue with an existing producer reservation associated with a domain. The workload may be based on a number of users associated with the domain and the number of queues is based on the workload.

In certain embodiments, each reservation (e.g., consumer or producer reservation) may be associated with a timer. In particular embodiments, the queue coordination data store may be an etcd data store and each reservation may be implemented using an etcd lease.

Embodiments as disclosed may thus have a number of advantages. Embodiments can thus allow message producers to read and create resource reservations in the coordinating data store corresponding to a message execution (a campaign) or a corresponding unit (e.g., accounts, websites, domains, etc.). The resource reservations reflect the state of the remaining work required by a message consumer. The message producer applies a usage strategy in resource selection which may optimally select queueing resources considering existing work volume, configured allocations for units, or messaging type.

Embodiments also allow message consumers to read queue reservations in the coordinating data store and select queueing resources to consume messages from. The message consumer may apply a usage strategy in resource selection which may optimally select queueing resources considering existing work volume, configured allocations for units, or messaging type.

Accordingly, embodiments may benefit from the strong consistency and reliability of the coordinating data source to improve messaging efficiency. In particular, embodiments may provide a number of advantages. A first advantage may be more optimized throughput—producers and consumers of messages may utilize the coordinating data store to improve throughput and efficiency while minimizing the scale of deployment required. Another advantage may be the preservation of execution ordering (e.g., for messages associated with an account, website, campaign, etc.), as the messaging system may be configured in a way which preserves campaign ordering. Similarly, the system can be configured to isolate (e.g., unit level) resources. For example, embodiments could be used to maximize availability for a particular account or website or to isolate particularly slow messaging strategy.

Advantages may also include dynamic message consumption. Producers and consumers may benefit from coordination using the coordination data store when using shared resources. The producer, for example, can direct messages to resources with lower volume (queues with fewer messages). The consumer, for example, can consume messages from resources with higher volume (queues with more messages). Thus, scalable message processing can be achieved using the coordinating data stored to eliminate the requirement of a static mapping between producers and consumers. This capability allows for dynamic scaling on either the producing or consuming side to optimize throughput.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIGS. 2A-2B are diagrammatic representations of an architecture of a notification system including an embodiment of a messaging system.

DETAILED DESCRIPTION

Figure 1:
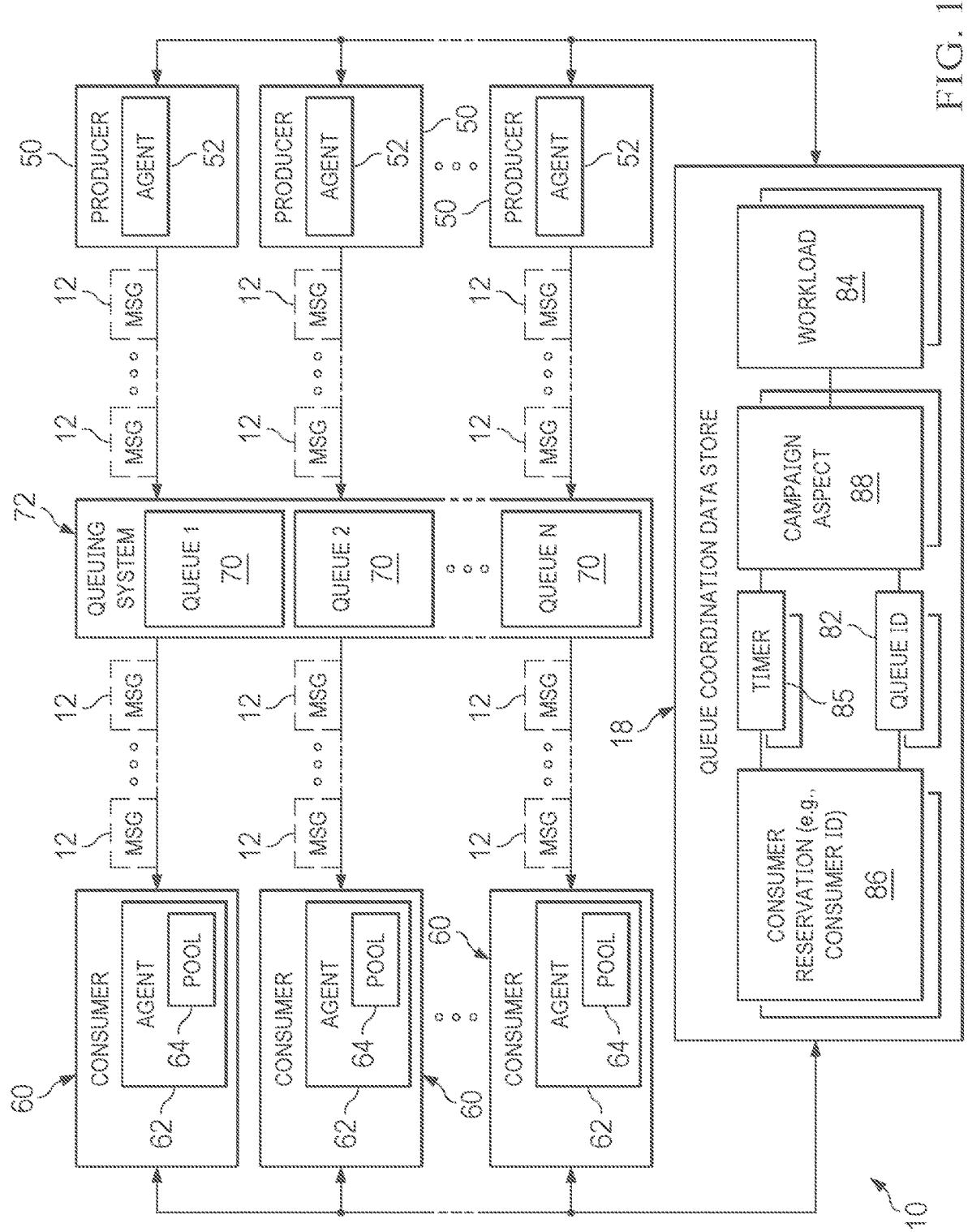
FIG. 1 is a diagrammatic representation of an architecture including an embodiment of a messaging system.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, a brief description of the context in which embodiments can be utilized may be helpful. Namely, digital notification systems. It will be noted, however, that while embodiments as described herein may be described in such a context, embodiments may be equally effectively employed in other contexts where messaging and queuing are utilized and all such amendments are fully contemplated herein without loss of generality.

As may be realized, in the current online environment, it is desirable to contact users at various points during the online activity. Certain notification systems may thus be provided to contact these users, including contacting these users based on their online activity (e.g., by email, push notification, etc.). To facilitate these contacts, these notification systems may utilize messaging systems to coordinate the sending of such notifications. Generally, these messaging systems provide a hardware or software infrastructure that provides for the sending of messages between the various hardware or software components in such a distributed computing environment. These messaging systems may thus be intended to handle a high volume of messages in a variety of contexts.

For example, based on a variety of criteria, notification systems may determine that notifications are to be sent to users (e.g., in some cases subscribers or participating users who have indicated a receptiveness to such notifications). Messages may be utilized in the sending of such notifications. For example, messages may be generated for the generation, sending or delivery of such notifications such that the various hardware or software entities involved in the sending of such notifications may coordinate the sending of such notifications.

To illustrate, a set of message producers may determine when notifications are to be delivered to one or more individual users (e.g., and what content to include such notifications, what channel the notification is to be delivered through, etc.). A notification message including details of the notification may be placed on a message queue by the producer. A notification consumer may obtain these notification messages from the message queue and based on the notification message, generate one or more notifications (e.g., obtain content, render templates, etc. associated with the notification and send the notification through a delivery channel, or provide the notification to a service or other application for delivering the notification through the notification channel, etc.).

As can be imagined, given the size and scale of the Internet and its users and the delivery channels for such notifications, the number of notifications generated, sent, or delivered over a relatively short time period may be astronomical (e.g., in the millions or billions), and commensurately the number of messages may also be incredibly voluminous. Moreover, the architecture of these notification systems may introduce additional complexities. Specifically, as these notification systems may be multi-tenant systems (e.g., that may be deployed in a cloud based computing platform or virtualized computing platform, etc.) designed to send notifications for multiple campaigns for multiple content providers (e.g., also referred to as "accounts" of the notification system) having multiple websites (also referred to as domains) it is important that the generation and sending of the notifications be somewhat equitably and timely generated and sent so notifications from different accounts, websites, campaigns, etc. are timely delivered. For example, if millions of notifications are to be generated for a campaign for a particular website for a particular account, it may be desired that the messages generated for such notifications do not overwhelm or otherwise burden the messaging system and thus adversely impact the timely production and consumption of messages for other campaigns (e.g., for other websites and other accounts). Thus, it is important that the messaging system employed by such a notification system be a scalable messaging system adept at handling such a high volume of messages and providing sophisticated capabilities for coordinating and managing the queuing of messages, including messages associated with the different accounts, websites, campaigns, etc. to ensure that throughput remains high and service disruptions are avoided.

These goals, among others, may be difficult to achieve. Typical systems which perform message processing usually do not coordinate production and consumption of messages in an optimal way and thus suffer from reduced throughput and a higher risk of service disruptions or backup. Moreover, such messaging systems do not provide unit-isolation of business channels to provide in-order delivery and isolate external sending performance effects.

While certain architectures have been tried for high volume messaging systems, these architectures have proved inadequate in various contexts, including for messaging systems employed in such notification systems. One such inadequate architecture for a messaging platform is a shared queue pool whereby a single shared queue pool is utilized to queue and process all messages. While this approach may be used to achieve uniform throughput, it does not provide business-level separation of resources, it does not preserve message ordering, and it introduces a higher risk of system-wide service disruptions.

Another existing method of message processing in high volume digital messaging systems is called allocated queuing. Here, queueing resources may be allocated individually to business units. For example, in a system of message processing where messages correspond to more than one business unit (for example, a publisher) this could involve allocating one or more queues for each. While this approach isolates system-wide service disruptions, and preserves message ordering, it does not provide efficient throughput.

Yet another method of message processing in high volume digital messaging systems is called separated shared queue pools. In this architecture, queueing resources are allocated to multiple shared pools. For example, in a system of message processing where messages correspond to more than one business unit (for example, a publisher) this could involve allocating one queue pool per class of business unit. While this approach achieves some of the benefits of both shared pools and allocated pools and does allow business-level separation, throughput is still inefficient—message ordering is not preserved, and such a system introduces a higher risk of system-wide service disruptions.

What is desired, therefore, are improved messaging systems, including improved high volume messaging systems that allow for the coordination and management of queues and the queuing and consumption of messages based on a wide variety of criteria, including tenants (e.g., accounts in a notification system), campaigns, websites, etc.

Accordingly, embodiments as disclosed may provide such messaging systems, including a queue coordinating data store to facilitate coordination among one or more message consumers and producers with respect to a set of message queues. In some cases, agents associated with message consumers or producers may create or update data in the coordination data store and utilize the data in the coordination data store to determine message queues on which to put messages (e.g., by a message producer) or message queues from which messages should be obtained and processed (e.g., by a message consumer).

Certain embodiments can therefore include a (producer) agent that may be included in a message producer to interface with the queue coordinating data store. The producer may be executing (in whole or in part) a campaign (e.g., which will be understood for purposes of this disclosure to mean any (quantifiable) grouping or set of messages or any quantifiable amount of processing that may result in the production of a set of messages). When executing a campaign therefore, the producer agent may determine (e.g., estimate) a workload (also referred to as size) associated with the campaign, where the workload is reflective of a number of messages that will be generated as a result of execution of the campaign. The producer agent may also determine a number of message queues that may be required for the campaign. The determination of the number of message queues may be based on the workload associated with the campaign.

The producer agent can then access the data of the queue coordinating data store to determine if any message queues have been associated with (also referred to as reserved for) the associated message producer, or an aspect of the campaign being processed (such as a domain associated with the campaign). If message queues have been reserved (e.g., associated in some manner with an aspect of the campaign such as a domain) the producer agent may store data in the queue coordinating data store associating the message producer or the (aspect of) the campaign with that message queue (referred to also as reserving the message queue for a campaign or campaign reservation, it will be noted a queue may be reserved in accordance with multiple campaigns or message producers). This campaign reservation data may comprise, for example, an indication of the aspect of the campaign (e.g., a domain) and a workload determined by the producer agent for the campaign, such as the size of the workload divided by the number of message queues determined for the campaign. A campaign reservation associated with a message queue may have an associated timer, such that an expiration of the timer that reservation may expire and be removed from the queue coordination data store. This timer may be configurable and may be set in some manner by the producer agent or may be associated with the queue coordination data store. Accordingly, in one embodiment, to reserve a previously reserved message queue, the producer agent may renew or reset the timer associated with a previous reservation. Additionally, the producer agent may add the determined workload for the campaign being executed to the workload already associated with that campaign reservation.

If the number of message queues that were already reserved in association with the aspect of the campaign (e.g., domain) is equal or greater than the number of required queues the message producer may start producing messages in association with the campaign, and will place the messages produced in association with the campaign on the reserved message queues. It will be understood that if the number of message queues that were already reserved in association with the aspect of the campaign (e.g., domain) is greater than the determined number of message queues for the campaign, all of the previously reserved message queues may be utilized for the campaign (e.g., instead of the determined number) or some method may be utilized to select the determined number of message queues from the number of previously reserved message queues. For example, the total workload associated with each previously reserved message queue (e.g., the sum of each workload associated with the message queue by each message producer in association with each campaign) may be determined and the previously reserved message queues with the lowest workloads may be selected to utilize for the determined number of message queues for the campaign or that actual number of messages in each previously reserved message queues may be determined and used to select previously reserved message queues.

If, however, the number of previously reserved message queues associated with the message producer or aspect of the campaign is less than the determined number of message queues for the campaign, additional message queues may be determined by the producer agent based on data associated with the set of message queues in the queue coordinating data store. For example, in one embodiment, the producer agent may determine a set of unused message queues that have not been reserved (e.g., in association with another campaign or aspect of a campaign such as a domain). If there are unused message queues, the producer agent may select as many of these unused queues as needed to obtain the determined number of message queues for the campaign, if possible (e.g., such that the number of previously reserved message queues and the selected unused queues is equal to the determined number of message queues). Again, if the number of unused message queues determined is greater than the number of message queues needed to obtain the determined number of message queues for the campaign, some method may be utilized to select unused message queues to reserve for the campaign. For each of these selected unused message queues, the producer agent of the message producer may store data in the queue coordinating data store associating the message producer or the campaign with those message queues to reserve the message queue such as an indication of the workload determined by the producer agent for the campaign.

If the number of message queues that are reserved in association with the aspect of the campaign (e.g., domain) is now equal or greater than the number of required queues the message producer may start producing messages in association with the campaign, and will place the messages produced in association with the campaign on the reserved message queues. If, however, the number of previously reserved message queues associated with the message producer or aspect of the campaign is still less than the determined number of message queues for the campaign, additional message queues may be determined by the producer agent based on data associated with the set of message queues in the queue coordinating data store or the message queues themselves.

In one embodiment, a producer agent can generate a workload weighting factor for each of the set of message queues (or a limited set of the message queues such as those message queues not previously reserved for the campaign). This workload weighting factor for a message queue may be based on, for example, the total workload associated with that message queue in the queue coordination data store or the actual number of messages in that message queue. The set of message queues may then be ranked or ordered based on the associated workload weighting factor. The producer agent may then select and reserve these message queues according to their ordering until the determined number of message queues for that campaign has been reserved. The message producer may start producing messages in association with the campaign, and will place the messages produced in association with the campaign on the reserved message queues.

In one embodiment, the producer agent may maintain a producer queue pool mapping an identifier for the execution of the campaign to identifiers of message queues reserved for the execution of the campaign. In this manner, as the message producer is producing messages it may access the mapping of campaigns to message queue identifiers and place produced messages on the identified message queues (e.g., in a round robin or some other manner).

Embodiments may also include a message consumer (also referred to as a worker) which obtains data from the same queue coordinating data store used by message producers (e.g., producer agents) for existing reservations and selects one or more queues to consume from. The message consumer then processes messages from the selected queue(s). For example, this processing may involve sending a digital notification according to a message obtained from the selected queue.

Certain embodiments can therefore include a (consumer or worker) agent that may be included in a message consumer to interface with the queue coordinating data store. Similar to the producer agent, the worker agent may maintain (or can obtain information on) a consumer queue pool comprising (identifiers) for a set of worked message queues from which the message consumer is currently obtaining messages. The number of message queues in the consumer queue pool may be at or under a queue limit which may be configurable or dynamically adjustable.

These worked message queues in the consumer queue pool may have a consumer (or worker) reservation associated with them in the queue coordination data store. The consumer reservation may comprise an association between an identifier for the message consumer and the message queue. Such a consumer reservation may also have an associated (e.g., configurable) timer, such that on expiration of that timer that consumer reservation may expire and be removed from the queue coordination data store.

Accordingly, the consumer may rebuild this consumer queue pool for the message consumer when the message consumer starts or at a particular interval (e.g., ten seconds, 30 seconds, etc.). Such a queue rebuild interval and the consumer reservation timer may be interrelated in some manner such that the consumer reservation timer length may be some multiple (e.g., twice) the time of the consumer rebuild interval. In one embodiment, to rebuild the consumer queue pool, the worker agent may first release all currently worked message queues that are idle. An idle message queue may be a message queue that has been empty longer than some (e.g., configurable) idle time limit. Thus, the worker agent may access the consumer queue pool of the message consumer and, for each of the worked message queues listed in the consumer queue pool for the message consumer, determine if that identified message queue is empty and for how long that message queue has been idle. Such message queue data may be maintained at the queuing system that implements the message queue or may be, for example, determined from queue coordination data store based on (e.g., lack of) producer reservations associated with that message queue in the queue coordination data store. Alternatively, the worker agent may maintain a message queue idle timer based on a last time a message was obtained by the message consumer from that message queue. Such a message queue idle timer can be maintained, for example, in the consumer queue pool at the message consumer.

Thus, the worker agent may release message queues in the consumer queue pool of the message consumer that are determined to be idle (also referred to as unregistering the message consumer from the message queue). Such a release may include deleting the association between the message consumer and that message queue in the queue coordination data store and removing that message queue (e.g., the identifier for that message queue) from the consumer queue pool of that message consumer.

Once all idle message queues of the consumer queue pool are released, the worker agent may renew consumer reservations on any remaining message queues of the consumer queue pool of the message consumer (e.g., the message queues of the consumer queue pool that were not determined to be idle). Such a renewal of the reservation may include resetting the timer of the consumer reservation comprising the association between that message consumer and that message queue such that the consumer reservation timer for that consumer reservation restarts.

If the number of message queues in the consumer queue pool of the message consumer after the consumer reservations on existing (non-idle) queue of the consumer queue pool are renewed is over the queue limit, the message consumer can then begin obtaining messages from the message queues identified in the consumer queue pool and processes the messages obtained from these message queues. If, however, the number of message queues in the consumer queue pool at this point is less than the queue limit, additional queues to consume from may be determined by the worker agent.

Specifically, in one embodiment, underworked queues may be filtered from the set of message queues (e.g., that are not already in the consumer queue pool of the message consumer) by determining an underworked score for each message queue (e.g., message queues not currently identified in the consumer queue pool). This underworked score may be based on the total workload associated with a message queue in queue coordination data store, the actual number of message in that message queue, or the number of message consumers associated with that message queue (e.g., the number of consumer reservations from other message consumers associated with that message queue in the queue coordination data store). Such an underworked score may be, for example, based on a standard deviation between the total workloads assigned to each of the message queues such that if a total workload or number of messages in a message queue is more than a (configurable) number (e.g., 2) of standard deviations from an average total workload or number of messages the message queue is considered underworked.

The set of message queues may then be ranked or ordered based on the associated underworked score (e.g., such that the most underworked queues are ranked or ordered higher). The consumer agent may then select and reserve these underworked message queues according to their ordering until the consumer queue pool comprises a number of message queues equal to the queue limit. In particular, the worker agent may select a highest ranked message queue based on the underworked score, reserve that message queue by associating the message consumer and the selected message queue in the queue coordination data store, and add that selected message queue (e.g., identifier for that message queue) to the consumer queue pool of that message consumer. If the number of message queues in the consumer queue pool is still below the queue limit, the next highest ranked message queue based on the underworked may be selected, reserved in the queue coordination data store, and added to the consumer queue pool. The addition and reservation of underworked message queues may continue in this manner until the queue limit is reached or until the set of underworked queues is exhausted.

If the number of message queues in the consumer queue pool of the message consumer is equal to the queue limit after underworked queues are reserved, the message consumer can then begin obtaining messages from the message queues identified in the consumer queue pool and processing the messages obtained from these message queues. If, however, the number of message queues in the consumer queue pool at this point is less than the queue limit, additional queues to consume from may be determined by the worker agent.

In one embodiment, if the set of underworked queues is exhausted and the queue limit of queues in the consumer queue pool has still not been reached, unworked queues of the set of message queues may be determined. These unworked queues may be message queues that have no producer reservations or that have no messages in the actual message queues. Thus, for example, the worker agent may access the queue coordination data store to determine message queues that do not have any producer reservations or have an indicator of having no associated workload. As worker agents of message producers may target such unworked queues when making producer reservations it may be desirable for message consumers to add these queues to consumer queue pools in anticipation of those unworked queues soon having workload added to them.

Consequently, when unworked queues are determined, the consumer agent may then select and reserve these unworked message queues until the consumer queue pool comprises a number of message queues equal to the queue limit. In particular, the worker agent may select a unworked queue (e.g., randomly from the set of unworked queues), reserve that unworked message queue by associating the message consumer and the selected message queue in the queue coordination data store, and add that selected message queue (e.g., identifier for that message queue) to the consumer queue pool of that message consumer. If the number of message queues in the consumer queue pool is still below the queue limit a next unworked message queue may be selected (e.g., at random), reserved in the queue coordination data store, and added to the consumer queue pool. The addition and reservation of unworked message queues may continue in this manner until the queue limit is reached or until the set of unworked queues is exhausted.

If the number of message queues in the consumer queue pool of the message consumer is equal to the queue limit after unworked queues are reserved, the message consumer can then begin obtaining messages from the message queues identified in the consumer queue pool and processing the messages obtained from these message queues. If, however, the number of message queues in the consumer queue pool at this point is less than the queue limit, additional queues to consume from may be determined by the worker agent.

Specifically, if the set of unworked queues is exhausted and the queue limit of queues in the consumer queue pool has still not been reached, the extra capacity of the message consumer may be utilized to consume messages from the largest existing queues. In particular, according to one embodiment, the remaining set of message queues (e.g., the set of message queues not already in the consumer queue pool of the message consumer) may be sorted or ranked in order of size as determined from the total workload associated with the message queue or actual number of messages in the message queues. For example, the worker agent may obtain the total workload of each of the remaining set of message queues from the queue coordination data store or the number of messages each of the remaining message queues and order the set of remaining message queues based on the size of the associated total workload with the largest message queues (e.g., with the highest workload or number of messages) ranked highest.

The consumer agent may then select and reserve these remaining message queues according to their workload or message ordering until the consumer queue pool comprises a number of message queues equal to the queue limit. In particular, the worker agent may select a highest ranked message queue based on the size ranking, reserve that message queue by associating the message consumer and the selected message queue in the queue coordination data store, and add that selected message queue (e.g., identifier for that message queue) to the consumer queue pool of that message consumer. If the number of message queues in the consumer queue pool is still below the queue limit the next highest ranked message queue based on the underworked may be selected, reserved in the queue coordination data store, and added to the consumer queue pool. The addition and reservation of these remaining message queues may continue in this manner until the queue limit is reached or until the set of message queues is exhausted. At this point, the message consumer can then begin obtaining messages from the message queues identified in the consumer queue pool for that message consumer and processing the messages obtained from these message queues.

Embodiments can thus allow message producers to read and create resource reservations in the queue coordination data store corresponding to a message execution (a campaign) or a corresponding unit (e.g., accounts, websites, domains, etc.). The resource reservations reflect the state of the work required by a message consumer. The message producer can apply a usage strategy in resource selection which may optimally select queueing resources considering existing work volume, configured allocations for campaigns or domains, or messaging type.

Embodiments also allow message consumers to read queue reservations in the queue coordinating data store and select queueing resources to consume messages from. The message consumer may apply a usage strategy in resource selection which may optimally select queueing resources considering existing work volume, configured allocations for units, or messaging type.

Accordingly, embodiments may benefit from the strong consistency and reliability of a queue coordinating data store to improve messaging efficiency. In particular, embodiments may provide a number of advantages. A first advantage may be more optimized throughput—producers and consumers of messages may utilize the queue coordinating data store to improve throughput and efficiency while minimizing the scale of deployment (e.g., computing resources) required. Another advantage may be the preservation of execution ordering (e.g., for messages associated with an account, website, campaign, etc.), as the messaging system may be configured in a way which preserves campaign ordering. Similarly, the system can be configured to isolate (e.g., unit level) resources. For example, embodiments could be used to maximize availability for a particular account or website or to isolate particularly slow messaging strategy.

Advantages may also include dynamic message consumption. Producers and consumers may benefit from coordination using the queue coordination data store when using shared resources. A message producer, for example, can direct messages to resources with lower volume (queues with fewer messages). A message consumer, for example, can consume messages from resources with higher volume (queues with more messages). Thus, scalable message processing can be achieved using the queue coordination data stored to eliminate any requirement of a static mapping between producers and consumers. This capability allows for dynamic scaling on either the producing or consuming side to optimize throughput. As yet another advantage, the architecture of certain embodiments may provide a high degree of fault tolerance such that hardware or software failures do not adversely impact the processing messages within such messaging systems.

Looking first at FIG. 1, then an architecture on one embodiment of a messaging system is disclosed. Messaging system 10 may include a queuing system 72 comprising a set of message queues 70. Message producers 50 produce messages 12 and place these messages on one or more message queues 70. Message consumers 60 consume messages 12 off one or more these message queues 70. Messaging system 10 also includes queue coordination data store 18 to facilitate coordination among message consumers 60 and producers 50 with respect to message queues 70. Queue coordination data store 18 may be adapted to store message queue identifiers 82 (e.g., identifiers for message queues 70) in association with one or more campaign reservations comprising a campaign aspect 88 (e.g., a domain), an associated timer 85, and a workload 84. When timer 85 expires for a campaign reservation, that campaign reservation may be removed from the queue coordination data store 18 (e.g., the campaign aspect 88 and workload 84 may be removed). Thus, each queue identifier 82 may be associated with multiple campaign aspects 88 (e.g., domains), where each campaign aspect (e.g., domain) 88 is associated with a timer 85 and a workload 88. Each queue identifier 82 in queue coordination data store 18 may also be associated with one or more consumer reservations 86 comprising an identifier of a message consumer 60 that is consuming messages from the message queues 70 associated with queue identifier 82. This consumer reservation may also be associated with a timer 85 such that the consumer reservation (e.g., the identifier 86 of message consumer 60) may be removed from the queue coordination data store 18 (e.g., at the expiration of the timer).

Worker agents 62 associated with message consumers 60, and producer agents 52 associated with message producers 50, may create or update data in the queue coordination data store 18 and utilize the data in the queue coordination data store 18 to determine message queues 70 on which to put messages 12 (e.g., by a message producer 50) or message queues 70 from which messages 12 should be obtained and processed by a message consumer 60.

Specifically, each message producer 50 may be executing (in whole or in part) one or more campaigns (e.g., a quantifiable grouping or set of messages or any quantifiable amount of processing that may result in the production of a set of messages). When executing a campaign therefore, the producer agent 52 may determine (e.g., estimate) a workload (also referred to as size) associated with the campaign, where the workload is reflective of a number of messages 12 that will be generated as a result of execution of the campaign. The producer agent 52 may also determine a number of message queues 70 that may be required for the campaign.

Such a determination may be made based on the number of anticipated messages or a number of users associated with a domain associated with the campaign. For example, in one embodiment, the campaign being executed by the message producer 50 may be associated with a particular domain (e.g., website or group of websites) such that messages generated for the campaign are associated with notifications to be sent to users associated with the domain. Thus, a workload for a campaign may be based on a number of users associated with the domain corresponding to the campaign. The determined number of message queues 70 may thus be based on the determined workload (e.g., number of users associated with the domain).

The producer agent 52 can then access queue coordination data store 18 to reserve the determined number of message queues 70. The specific message queues 70 to reserve may be determined by producer agent 52 based on message queues 70 already reserved for an aspect of the campaign (e.g., message queues 70 already reserved in association with campaigns for a same domain) or the workload associated with message queues 70.

Specifically, the producer agent 52 for the message producer 50 may access queue coordination data store 18 to determine if any (identifiers for) message queues 82 are associated with the aspect of the campaign 88 (e.g., a domain associated with the campaign). If identifiers 82 for message queues 70 are associated with the campaign aspect for the campaign (e.g., as determined from campaign aspects 88 associated with the identifiers 82 for the message queues 70), the producer agent 52 may renew or reset the timer 85 associated with that campaign aspect 88 (e.g., domain)). Additionally, the producer agent 52 may add the determined workload for the campaign being executed to the workload 84 associated with that campaign aspect 88 (e.g., domain).

If additional message queues 70 are needed to obtain the determined number of message queues for the campaign the producer agent 52, these additional message queues may be determined by the producer agent 52 based on data associated with the (identifiers for the) set of message queues 82 in the queue coordination data store 18. For example, the producer agent 52 may access queue coordination data store 18 to determine (identifiers for) a set unused message queues 82 that have not been reserved (e.g., that are not associated with any campaign aspect 88), or utilize workload 84 associated with each campaign aspect 88 for (identifiers for) message queues 82 to determine workload weighting factors for message queues 70 and select message queues 70 for the campaign based on those workload weighting factor.

Once these additional message queues 70 are selected for the campaign, producer agent 52 can reserve these message queues 70 by associating an aspect of the campaign 88 (e.g., a domain associated with the campaign) and the workload 84 determined for that campaign with each (identifier for) each message queue 82 determined for the campaign being executed by that producer 50 in queue coordination data store 18. The producer agent 52 may also set timer 85 for that campaign aspect 88 (e.g., domain) if needed. Message producer 50 may then produce messages 12 in association with the campaign being executed and place those messages 12 on the message queues 70 of queueing system 72 reserved for the campaign using queue coordination data store 18.

Message consumers (worker) 60 obtain messages 12 from queues 70 of queuing system 72 to process such messages 12. In particular, each message consumer 60 may select one or more queues 70 to consume from based on data in queue coordination data store 18. Each consumer 60 can therefore include a (consumer or worker) agent 62. Each worker agent 62 may maintain a consumer queue pool 64 comprising (identifiers) for a set of worked message queues 70 for that message consumer 60 from which that message consumer

60 is currently obtaining messages 12. The number of message queues in the consumer queue pool 64 may be at, or under, a queue limit which may be configurable or dynamically adjustable.

Each worked message queue 70 identified in the consumer queue pool 64 of a message consumer 60 may have a consumer reservation 86 for that message consumer 60 associated with the (identifier for) that message queue 82 in the queue coordination data store 18. The consumer reservation 86 may comprise an association between an identifier for the message consumer 60 and the (identifier for the) message queue 82. Such a consumer reservation may also have an associated (e.g., configurable) timer 85, such that on expiration of that timer 85 that consumer reservation 86 may expire and be removed from the queue coordination data store 18.

Accordingly, the consumer agent 62 may rebuild this consumer queue pool for the message consumer when the message consumer starts or at a particular interval (e.g., 10 seconds, 30 seconds, etc.). In one embodiment, to rebuild the consumer queue pool 64, the worker agent 62 may first release all currently worked message queues in consumer queue pool 64 that are idle. An idle message queue may be a message queue that has been empty longer than some (e.g., configurable) idle time limit. This idle determination may be made using data from queue coordination data store 18 or queuing system 72. Such a release may comprise deleting the consumer reservation 86 in association with the (identifier for) that message queue 82 in the queue coordination data store 18 and removing that message queue (e.g., the identifier for that message queue) from the consumer queue pool 64 of that message consumer 60.

Once all idle message queues of the consumer queue pool are released, the worker agent 62 may renew consumer reservations 86 on any remaining message queues identified in the consumer queue pool 64 of the message consumer 60 (e.g., the message queues of the consumer queue pool 64 that were not determined to be idle). Such a renewal of the reservation may comprise resetting the timer 85 of the consumer reservation 86 comprising the association between that message consumer 60 and the (identifier for) that message queue 82 such that the consumer reservation timer for that consumer reservation restarts.

Worker agent 62 may then determine any additional message queues 70 to add to the consumer queue pool 64 for the consumer 60 needed to reach the queue limit for that message consumer 60. Such additional queues may be determined by determining underworked or unworked messages queues 70 based on the workload 84 associated with each of the (identifiers for) the message queues 82 in queue coordination data store 18. These additional message queues 70 may then be added to the consumer queue pool 64 of that message consumer 60 (e.g., identifiers for the message queues 70 may be added to the consumer queue pool 64). The message consumer 60 can then begin obtaining messages 12 from the message queues 70 identified in the consumer queue pool 64 and processes the messages 12 obtained from these message queues.

While it will be apparent that embodiments as described herein may be effectively applied in almost any computing system where it is desired to utilize messages produced or consumed by independently or asynchronously operating message producers and consumers, embodiments may be employed to particular use in certain computing systems that by their nature may generate high volumes of such messages. One example of such a high volume system is a notification system. As discussed, notification systems may determine that notifications are to be sent to users, usually over the Internet (e.g., in some cases subscribers or participating users who have indicated a receptiveness to such notifications through a website or the like). Messages may be utilized in the sending of such notifications. For example, messages may be generated for the generation, sending or delivery of such notifications such that the various hardware or software entities involved in the sending of such notifications may coordinate the sending of such notifications. Embodiments of messaging systems as disclosed herein may thus be usefully applied in the context of such notification systems.

Figure 2B:
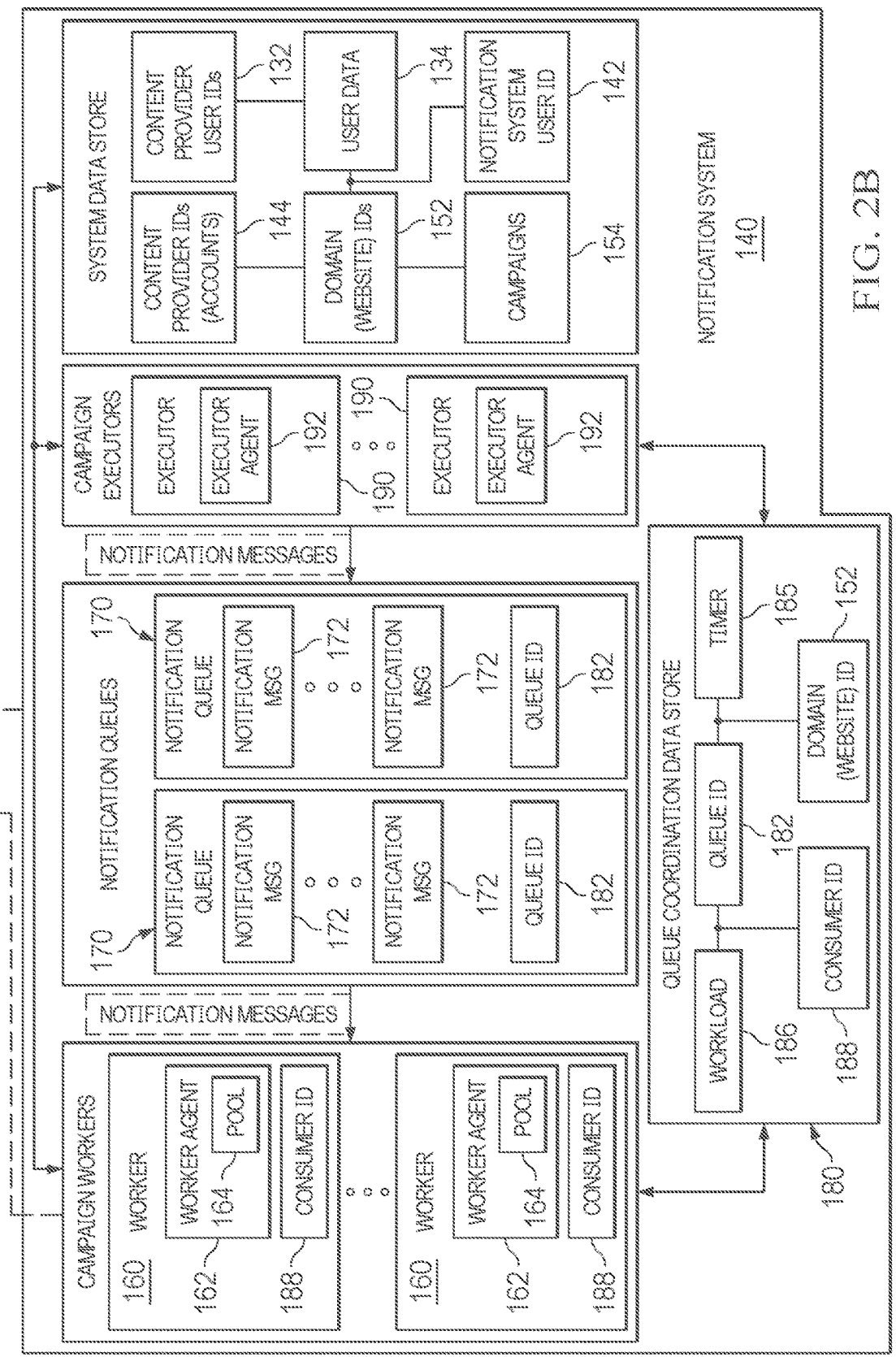

With that in mind, attention is now directed to FIGS. 2A-2B, where an architecture of a distributed networked computing environment computer including a notification system employing an embodiment of a messaging system is presented. Notification system 140 is coupled to user devices 108 and content providers 120 over network 198. The network 198 may be the Internet, a wide area network (WAN), a local area network (LAN), an intranet, an internet, a wired network, a wireless network (including a cellular network), or some combination thereof.

Content provider 120 may be any for-profit or non-profit organization or entity (used herein interchangeably) that, as part of its operations, needs to conduct online activity. To facilitate interaction with users and conducting online activity with these users, the content providers 120 may include a web server 122 and one or more web pages 126 in an associated data store. These web pages 126 may, for example, be associated with one or more domains associated with the content provider 120. Users may access these web pages 126 through a browser 110 on user devices 108. These user devices 108 may be, for example, personal computers, laptop computers, mobile phones, watches or other wearables, or other data processing devices and may include a processor, a display (virtual or physical) and a user interface. Content providers 120 may also include other means of contacting users such as through a call center 125 or other user touch points which may be online or offline.

Accordingly, content providers 120 may include user identifiers 132 (content provider user ids) associated with users who access their web sites or domains through web pages 126. Such a content provider user id 132 may be a unique value associated with the user such as an email or the like. For example, the content provider user id 132 may be a hash of a user's email (e.g., for security purposes) or other substantially unique identifier for a user. Moreover, a content provider 120 may have user data 134 associated with such a content provider user id 132. This data may be data collected on, or provided by, a user accessing web pages 126 of the content provider 120.

For example, a user may subscribe to notifications from a content provider 120. Such users may have opted into, or otherwise provided permission, to "subscribe" to receive notifications or other data from a content provider 120 (e.g., through the content provider 120 website 126 that they are accessing, or through another channel such as SMS, email, push notifications for an app, etc.). For example, a subscription can include a single messaging subscription which is generated when a user enables or allows notification permissions on a website. Content provider user ids 132 may be identifiers of users who have subscribed to receive notifications from the content provider 120.

Notification system 140 may thus be adapted to send such notifications to users who have subscribed to receive such notifications. Specifically, these notifications can be delivered (or initiated) by notification system 140 and those notifications delivered to the users at user devices 108 through one or more notification channels (e.g., through website 126, SMS, email, push notification for an app or another type of notification channel).

Thus, notification system 140 may store content provider identifiers (also referred to as an account or account identifier) 144 where each of those account identifiers 144 may be associated with, and identify, a content provider system 120 that desires to have notifications provided by the notification system 140 to their subscribers. Notification system 140 may also maintain a list of domains (or website) identifiers 152 for content providers 120 (e.g., the domains or web pages provided by a content provider 120 may be associated with account identifier 144 for that particular content provider 120). These domain IDs 152 may identify domains or websites associated with web pages 126 provided by the content providers 120 and be associated with various information such as interests, verticals, demographic information, etc., associated with these domains.

Moreover, for each of the content providers 120, the notification system 140 may maintain content provider user ids 132 for users associated with that content provider 120 (e.g., users who access the web sites or domains of that content provider 120 through web pages 126 or who have subscribed to notifications from that content provider 120). These content provider user ids 132 may be associated with the content provider id 144 for that content provider 120.

One or more web pages 126 provided by the content providers 120 may include an embed code 128. This embed code 128 can cause the web browser 110 rendering the web page 126 to request a notification system agent 112 from notification system 140 or another location (e.g., if the agent 112 is not already present or executing on the user device 108). The embed code 128 may comprise a script tag, an include tag or the like. The agent 112 may include code such as JavaScript or the like, which may be executed by the browser 110 at the user's device 108. A notification system agent 112 may also be included in (e.g., embedded in) other applications (e.g., "apps") that are executed or installed on a user device 108 (e.g., native application or the like).

In an embodiment, the agent 112 is a program or script which executes on a website and is configured to generate and track a user device identifier that identifies one or more subscribers corresponding to a user device 108. The agent 112 may create a unique user identifier associated with user device 108 or a user on the user device 108 that may be passed to notification system 140 and stored at notification system 140. In an embodiment, the notification system unique user device identifier 142 (SSUUID) (also referred to "notification system user device identifier" or "notification system user device identifier data") may be stored in association with an identifier 144 of a content provider system 120. Advantageously, following the generation of the SSUUID the online events by a user or user device 108 may be identified and tracked.

In one embodiment, the SSUUID 142 may be associated with a user who has opted into or otherwise provided permission to "subscribe" to receive notifications or other data from a content provider 120 (e.g., through the content provider 120 website 126 that they are accessing or through another channel). For example, a subscription can include a single messaging subscription which is generated when a user enables or allows notification permissions on a website. In an embodiment, the SSUUID 142 that is generated can be coupled with subscriber registration details to enable registration of the subscription such as a subscription endpoint, one or more encryption keys required for notification delivery, a subscription expiration time, etc. Thus, for example, a subscription may allow a push messaging system (e.g., associated with content provider 120) to send and deliver notifications to a user with such a subscription. Thus, this SSUUID 142 for a user may be stored at the notification system 140. Specifically, each of the SSUUIDs 142 for a user may be associated with a corresponding content provider user id 132 for each of the content providers 120 for which that user has subscribed to received notifications.

To generate such a SSUUID 142 for example, agent 112 may detect a set of idempotent functions invoked by a web browser 110 of a user device. The set of functions is used to generate an output or identifier specific to the user device's web browser state or configuration. Example functions include, but are not limited to, static details provided by the browser such as the useragent information, whether localStorage is enabled, rendering images using Canvas and WebGL which add more variation between devices depending on browser capabilities (e.g., available fonts), etc. In an embodiment, the agent 112 or notification system 140 generates a final unique value based on the combination of the output of the functions identified in the collection phase. For example, the unique identifier may be generated by concatenating the output of these functions and providing the concatenated outputs as an input to a one-way hashing function. Advantageously, the functions executed on the user device are idempotent, such that the same results are produced by the web browser 110 throughout the session as well as across multiple sessions on different websites. The generation and use of such an identifier may also be understood with reference to U.S. Pat. No. 11,677,848 entitled "Subscription Management and Web-Based Activity Tracking in a Computing Environment" by inventors Smith and Taylor and issued on Jun. 13, 2023, which is incorporated herein by reference in its entirety for all purposes.

Accordingly, each of the content providers 120 may desire to have notifications provided to their subscribers (users) based on one or more campaigns 154 that they can define or otherwise specify. Each of the campaigns 154 may thus be associated with an identifier 144 of the content provider 120 that defined the campaign 154. The campaign 154 may also be associated with a particular website 152 of the identified content provider 144 such that notifications in association with the campaign 154 may only be sent to users who subscribed through, or who are otherwise associated with, the identified website 152. The campaign 154 may also specify one or more rules for generating notifications based on that campaign, including targeting rules defining interests or other attributes associated with the campaign 154, content rules or identification for content to be included such notifications, etc. The campaign 154 may also include restriction or timing rules on the campaign, such as a (e.g., maximum) number of notifications that may be sent in a time period (or maximum number of notifications per user in a time period) that the content provider 120 desires, or any information the content provider 120 desires to be provided with a notification for the campaign 154. The campaign 154 may also include a specification of a delivery (or transport) notification channel through which they would like any notification associated with that campaign 154 to be provided. The campaigns 154 may be specified by a content provider 120 (e.g., a user associated with content provider 120) through an interface or through some other channel or mechanism provided by notification system 140 or operators of notification system.

Notification system 140 may thus provide notifications in association with campaigns 154 using campaign executors 190 and campaign workers 160. Campaign executors 190 are one or more processes (e.g., process, threads, etc.) that process campaigns 154 (e.g., at a certain time period or based on some other trigger or criteria). Each campaign executor 190 is thus adapted to obtain a campaign 154 (e.g., scheduled for execution), determine the website identified by the campaign using domain identifier 152 for the website and the set of subscribers (users) associated with the identified website that are to have a notification provided to them (e.g., using user IDs 132 or 142).

The executor 190 can then generate one or more notification message 172 for the notifications to be sent for that campaign. For example, the executor 190 may generate a notification message 172 for each user of the website to whom a notification is to be sent, where that notification message 172 includes associated data (e.g., the user identification, website identification, channel identification, etc.) for generating a notification to that user according to the defined campaign 154. The executor 190 places generated notification messages 172 on a notification queue 170.

Campaign workers 160 are adapted to act as consumers to consume these notification messages 172 on the notification queues 170 to generate the notification to the users. In particular, worker 160 may obtain a notification message 172 from notification queue 170 and, based on the notification message, generate one or more notifications (e.g., obtain content, render templates, etc. associated with the notification and send the notification through a delivery channel, or provide the notification to a service or other application for delivering the notification through the notification channel, etc.).

As can be seen then, executors 190 may process multiple campaigns for multiple websites and multiple users to produce notification messages 172 on multiple notification queues 170 substantially simultaneously while, at the same time, workers 160 may consume such notification messages 172 for the multiple campaigns for multiple websites for multiple users to generate such notifications. Thus, millions or even billions of notification messages 172 may be produced and consumed in a very small time frame, and the workloads of both executors 190 and workers 160 and the size (e.g., number of notification messages 172) of each notification queue 170 may be incredibly dynamic and widely variable. The throughput requirements of the system may thus be highly dynamic and variable as well.

Notification system 140 may thus provide a messaging system to efficiently coordinate between the executors 190 acting as message producers and campaign workers 160 acting a message consumer in the messaging system. The messaging system includes the set of notification queues 170 which may be implemented in a messaging system such as message queuing service or the like (e.g., Amazon's SQS, IBM's MQ, RabbitMQ, Apache Kafka, etc.), along with a worker agent 162 included in each worker 160, an executor agent 192 in each executor 190, and a queue coordination data store 180.

The queue coordination data store 180 may be, for example, a consistent and highly available key value data store such as etcd, MongoDB, Redis, etc. or another type of data store. Queue coordination data store 180 includes a queue ID 182 for each of the notification queues 170. Associated with each of the queue IDs 182 (and thus associated with each notification queue 170) can be one or more domain IDs 152 indicating that notification messages 172 for a campaign 154 associated with the website associated with domain ID 152 may have been placed on that notification queue 170. Additionally associated with a notification queue 170 (e.g., the queue ID 182 for the notification queue) may be a workload 186. A workload 186 may be an indication of the volume of notification message 172 associated with that notification queue 170. In particular, workload 186 may be associated with domain ID 152 and queue ID 182, such that each queue ID 182 may have zero or more associated domains 152 and each associated queue ID 182 and domain ID 152 may have an associated workload 186.

Timer 185 may indicate a reservation time for the associated notification queue. In one embodiment there may be a timer 185 for each website identified by each domain ID 152 associated with the notification queue ID 182 such that the associated notification queue 170 may be reserved (e.g., "leased") for a time for each of the identified websites identified by domain ID 184 associated with the notification queue ID 182 (and the domain ID or associated workload 186 may be removed from queue coordination data store 180 at the expiration of that timer 185).

One or more consumer IDs 188 may also be associated with a queue ID 182, where each of those consumer IDs 188 may be associated with a worker 160 and indicate that the identified worker 160 has a consumer reservation for the notification queue 170 associated with that queue ID 182 and is consuming notification messages 172 from that notification queue 170. Such a consumer reservation may also have a timer 185 such that the consumer ID 188 associated with the queue ID 182 may be removed from queue coordination data store 180 at the expiration of that timer 185.

It will be noted that in certain implementations a data store (e.g., etcd) may be utilized such that certain data (e.g. keys and associated values) may have a time to live associated with them (e.g., etcd leases), such that timer 185 may not be explicitly stored or maintained by executor 190 or worker 160 but may instead be an artifact of the manner in which data is stored in the queue coordination data store 180 or the type of data storage system utilized to implement queue coordination data store 180.

When executor 190 executes a campaign 154 the executor agent 192 may determine a campaign workload for the execution of that campaign 154. This campaign workload may be associated with the number of notifications (e.g., or notification messages 172) that will need to be generated for that campaign. This may be done, for example, by identifying the one or more websites (domain IDs 152) associated with that campaign 154, and then identifying the number of users (e.g., user IDS 132 or 142) associated with each of those websites that will be receiving notifications for the campaign. In some embodiments, executor agent 192 then splits this campaign workload into a set of chunks of the same or different sizes. For example, the number of users may be divided by a set number to determine the number of chunks. The number of chunks may indicate a determined number of queues needed for that campaign.

The executor agent 192 can then query the queue coordination data store 180 with the domain ID(s) 152 identifying the website for which the campaign 154 is being executed to determine the notification queues 170 (if any) associated with that domain ID 152 along with the workload 186 for each of those queues 182. In response to this request the queue coordination data store 180 can return any queue identifiers 182 and workloads 186 for notification queues 170 assigned to that domain ID 152.

If there are notification queues 170 (e.g. identified by queue IDs 182) already associated with the website identified by domain ID 152, the executor agent 192 may "renew the leases" on these notification queues 170 by adding a certain amount of time to time 185 associated with both that domain ID 152 and that queue ID 182 (or by resetting the time 185, such as by resetting the time to live associated with that domain ID 152 and queue ID 182 association). Moreover, for each notification queue 170, executor agent 192 may add the determined workload (e.g., the workload for one or more chunks of the campaign workload determined by the executor agent 192) to the workload 186 associated with that domain ID 152 and that identified notification queue 170. During processing of the campaign 154 then, the executor agent 192 can then ensure that all notification messages 172 produced by the executor 190 for that campaign 154 are enqueued on those notification queues 170.

In one embodiment, the executor agent 192 may maintain a producer queue pool mapping an identifier for the execution of the campaign to identifiers of notification queues 170 the executor agent 192 reserved for the execution of the campaign. In this manner, as the executor 190 is producing messages it may access the mapping of campaigns to message queue identifiers and place produced messages on the identified notification queues 170 (e.g., in a round robin or some other manner.).

If there are not any notification queues 170 associated with the website (e.g. domain ID 152) for the campaign, or executor agent 192 determines that the identified notification queues 170 (e.g., identified by queue IDs 182) do not have sufficient availability (e.g., as determined by a comparison of the determined campaign workload or the size of a chunk of the campaign workload to the workload 186 of one or more of the identified notification queues 170 associated with the domain ID 152), the executor agent 192 may request queue identifiers 182 for all notification queues 170 and their associated workload 186. The executor agent 192 can make a determination of one more notification queues 170 to reserve and how much of the workload for the campaign (e.g., how many chunks of the workload) should be placed in each of the determined notification queues 170.

For example, the executor agent 192 may first determine if there are any unused (or underutilized) queues (e.g., where the workload 186 associated with that notification queue 170 is below some threshold). If there are sufficient unused notification queues 170 the executor agent 192 may reserve these notification queues 170. Here, the executor agent 192 may associate the domain ID 152 of the website associated with the campaign with the queue IDs 182 of the selected unused notification queue 170 and add a certain amount of time to time 185 associated with both that domain ID 152 and that queue ID 182 (e.g., or resetting the time to live associated with that domain ID 152 and queue ID 182 association). Moreover, executor agent 192 may add the determined workload (e.g., the workload for one or more chunks of the campaign workload determined by the executor agent 192) to the workload 186 associated with the identified notification queue 170 and domain ID 152 for the campaign. During processing of the campaign 154 then, the executor agent 192 can ensure that all notification messages 172 produced by the executor 190 for that campaign 154 are enqueued on those notification queues 170.

If there are not a sufficient number of unused notification queues 170 the executor agent 192 may weigh the remainder of the queues based on a variety of criteria (e.g., such as workload, size of the campaign workload (or chunks), the timers 185 associated with each domain ID 152 for the queue ID 182, the number of domain IDs associated with the queues ID 182 for the notification queue 170, or other criteria). Based on these weights the executor agent 192 may select one or more of these notification queues 170. Again, the executor agent 192 may associated the domain ID 152 of the website associated with the campaign with the queue IDs 182 of the identified notification queue 170 and add a certain amount of time to timer 185 associated with both that domain ID 152 and that queue ID 182 (e.g., or set a time to live for that association). Additionally, executor agent 192 may add the determined workload (e.g., the workload for one or more chunks of the campaign workload determined by the executor agent 192) to the workload 186 associated with the identified notification queue 170 and the domain ID 152. During processing of the campaign 154 then, the executor agent 192 can ensure that all notification messages 172 produced by the executor 190 for that campaign 154 are enqueued on those notification queues 170.

Workers 160 can thus consume messages off these notification queues 170. Each of these workers 160 may start up or reevaluate its status at a certain interval and consume messages from one or more identified notification queue 170. Worker 160 may include a worker agent 162 to identify the notification queue 170 from which to consume. In particular, worker agent 162 may maintain a consumer queue pool 164 identifying notification queues 170 from which worker 160 is consuming messages 172. The number of notification queues 170 from which the worker 160 may consume messages may be limited to a queue limit (e.g., the number of queues 170 identified in the consumer queue pool 164 may be limited to a number defined by the queue limit). Thus, worker agent 162 can reserve one or more notification queues 170 for that worker 160 by associating a consumer ID 188 associated with that worker 160 to the queue ID 182 associated with that notification queue 170 in queue coordination data store 180 and adding (an identification of) that notification queue 170 to the consumer queue pool 164. The worker agent 162 can then ensure that worker 160 consumes notification messages 172 from only those notification queues 170 in consumer queue pool 164.

Specifically, worker agent 162 may determine a number of notification queues 170 to consume notification messages 172 from. Such a determination may be based on, for example, notification queues 170 (queue IDs 182) in consumer queue pool 164 currently assigned to that worker 160, the workloads of those currently assigned queues 170, the number of workers 160 (e.g., consumer IDs 188 assigned to those notification queues 170, the workloads 186 of other notification queues 170, the number of workers 160 (e.g., consumer IDs 188) assigned to those other queues, etc.

In particular, the worker agent 162 may rebuild the consumer queue pool 164 at some interval. This rebuilding may include releasing idle notification queues 170 identified in the consumer queue pool 164 (e.g., removing the association between the consumer ID 188 and queue ID 182 in the queue coordination data store 180 and removing that notification queue 170 from the consumer queue pool 164). This rebuilding may also include resetting the timer 185 associated with queue IDs 182 and the consumer ID 188 (e.g., resetting the time to live associated with the combination of queue ID 182 and consumer ID 188) for other notification queues 170 identified in the consumer queue pool 164 that are not determined to be idle.

If the number of notification queues 170 identified in the consumer queue pool 164 is below the queue limit for the consumer queue pool 164, worker 160 may request the list of notification queues 170 (e.g., the set of queue IDs 182), their associated workloads 186, or the associated consumer IDs 188 for each of those notification queues 170 from queue coordination data store 180. The worker agent 162 can then determine a number of least worked or "underworked" notification queues 170. Such a determination may be made based on the workloads 186 of each of the notification queues 170 or the number of workers 160 (e.g., consumer IDs 188) assigned to each of the notification queues 170 (e.g., queue IDs 182). Such a determination may be, in some embodiments, based on a standard deviation between the workloads 186 assigned to each of the notification queues 170, or based on the workload 186 per number of assigned workers 160 (e.g., consumer IDs 188 associated with the queue ID 182) or other criteria or statistics).

Once the set of notification queues 170 from which to consume notification messages 172 are identified by the worker agent 162, the worker agent 162 can associate the consumer ID 188 for that worker 160 to the queue IDs 182 for those notification queues 170 in the queue coordination data store 180 and ensure that worker 160 consumes notification messages 172 from only those identified notification queues 170. These identified notification queues 170 may also be added to the consumer queue pool 164 for that worker 160. In this manner, executors 190 are trying to enqueue notification messages 172 in queues 170 that have the fewest messages 172 while workers 160 are trying to read from notification queues 170 that have the greatest number of messages.

Figure 3:
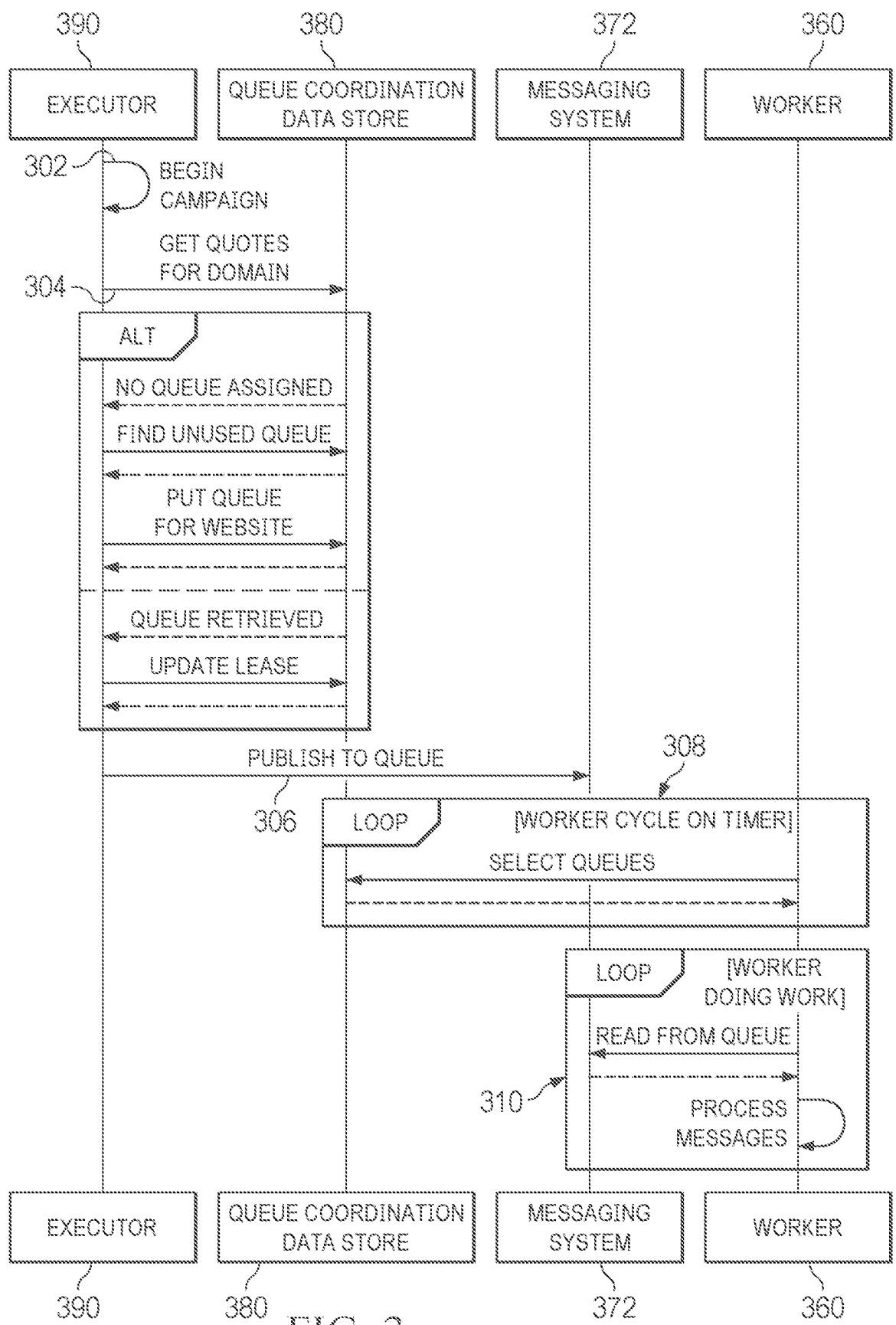
FIG. 3 is a flow diagram of an embodiment of the coordination of message consumers and producers in a messaging system using a queue coordination data store.

Moving now to FIG. 3, the coordination of entities in an embodiment of a messaging system is depicted. The messaging system may include one or more executors 390 and one or more workers 360 publishing messages to, and consuming messages from, message queues maintained by messaging system 372 (e.g., SQS). Executors 390 and workers 360 may utilize queue coordination data store 380 (e.g., implemented using etcd) to determine message queues to publish to, and consume from.

Specifically, each executor 390 may, at some point, begin executing a campaign associated with a website (domain) (STEP 302). Executor 390 can associate message queues in messaging system 372 with that domain using queue coordination data store 380 (STEP 304). Such an association may include reserving message queues for the domain in queue coordination store 380 for a time period along with storing (or updating) an indication of a workload for that campaign in association with that queue and domain. The message queues to reserve may be message queues already associated with the domain such that the reservation on those queues is made by resetting the associated time period or the queues may be queues with the lowest workloads, or queues determined in some other manner. The executor can then publish messages in association with that campaign to the queues reserved for the domain associated with the campaign (STEP 306).

Likewise, each worker 360 may, at some interval, select message queues of messaging system 372 tor a consumer queue pool from which to consume (read) messages (STEP 308). This selection may be based on data in queue coordination data store 380 associated with the message queues, including which message queues are idle, which message queues the worker 360 was consuming messages from in the previous interval, which message queues are underworked, unworked, or currently have the most workload or messages. Once the message queues for the consumer queue pool for the current interval are determined, the worker 360 may reserve those message queues (e.g., associate an identifier for that worker 360 with that message queue in queue coordination data store 380 for a time period), and read and process messages from the message queues of the consumer queue pool during the consumer queue pool rebuild interval (STEP 310).

As discussed, in one embodiment a queue coordination data store may be implemented using etcd. Thus, etcd leases may be used to associate identifiers for queues with domains and workloads for those domains and the etcd lease mechanism may serve as a timer for such a producer reservation. Likewise, an etcd lease may be used to associate identifiers for message queues with identifiers for worker processes and the etcd lease mechanism may serve as a timer for such a consumer reservation.

In some embodiments, therefore, a producer lease (e.g., a producer reservation using etcd as the queue coordination data store) may be comprised of three keys—a queue key, with the structure /q/{queue}; a domain or "source" key, with the structure /s/{source}/{queue}, and a workload key /pu/${queue}/${source} where the value of this key may be the number of users for the domain (e.g., associated with a campaign). A message producer may thus interact with these keys through certain operations. One of these operations may include registering a queue domain (source) (e.g., which may create the lease). Another operation may be retrieving queues registered to a domain (e.g., scanning the source keys) to, for example, determine which queues (e.g., keys) are already reserved for a domain. A message producer operation may also include retrieving message queues which already have reservations (e.g., scanning the queue keys) such as when determining queues to utilize for a campaign based on weighting. These keys may also be interacted with by producers in operations related to retrieving workload for (e.g., all) queues (e.g., by scanning the projected utilization keys). This is used during queue assignment when we are sorting reserved queues by work volume to determine queues with the lowest workload.

As a non-limiting example, if a queue is determined to be used for a campaign for a message producer and a lease is generated, three keys may be created. Assume queue 0 is being assigned to domain a.com which has 1000 subscribers. A message producer may create a lease binding three keys—/q/0—to indicate this queue is registered for scheduling; /s/a.com/0—to indicate a.com is scheduling to queue 0 and /pu/0/a.com=1000—to indicate the workload on this queue for the domain a.com.

Similarly, a consumer or worker lease (e.g., a consumer reservation using etcd as the queue coordination data store) may be comprised of two keys: the queue key mentioned above, with the structure /q/{queue} and a worker key /w/${queue}/${worker}. Accordingly, a worker lease is comprised of this key and the "worker" is just identified with a process identifier for that worker.

A message consumer may thus interact with these keys through certain operations. These operations may include registering a worker for a queue (e.g., creating the lease); retrieving (e.g., all) queues (e.g., scanning the queue keys); retrieving queues which are being worked or are included in the consumer queue pool (e.g., scanning the worker keys); updating the queue size on the worker key (e.g., updating the value of the worker key); and releasing a queue (e.g., deleting the worker key).

Figure 4:
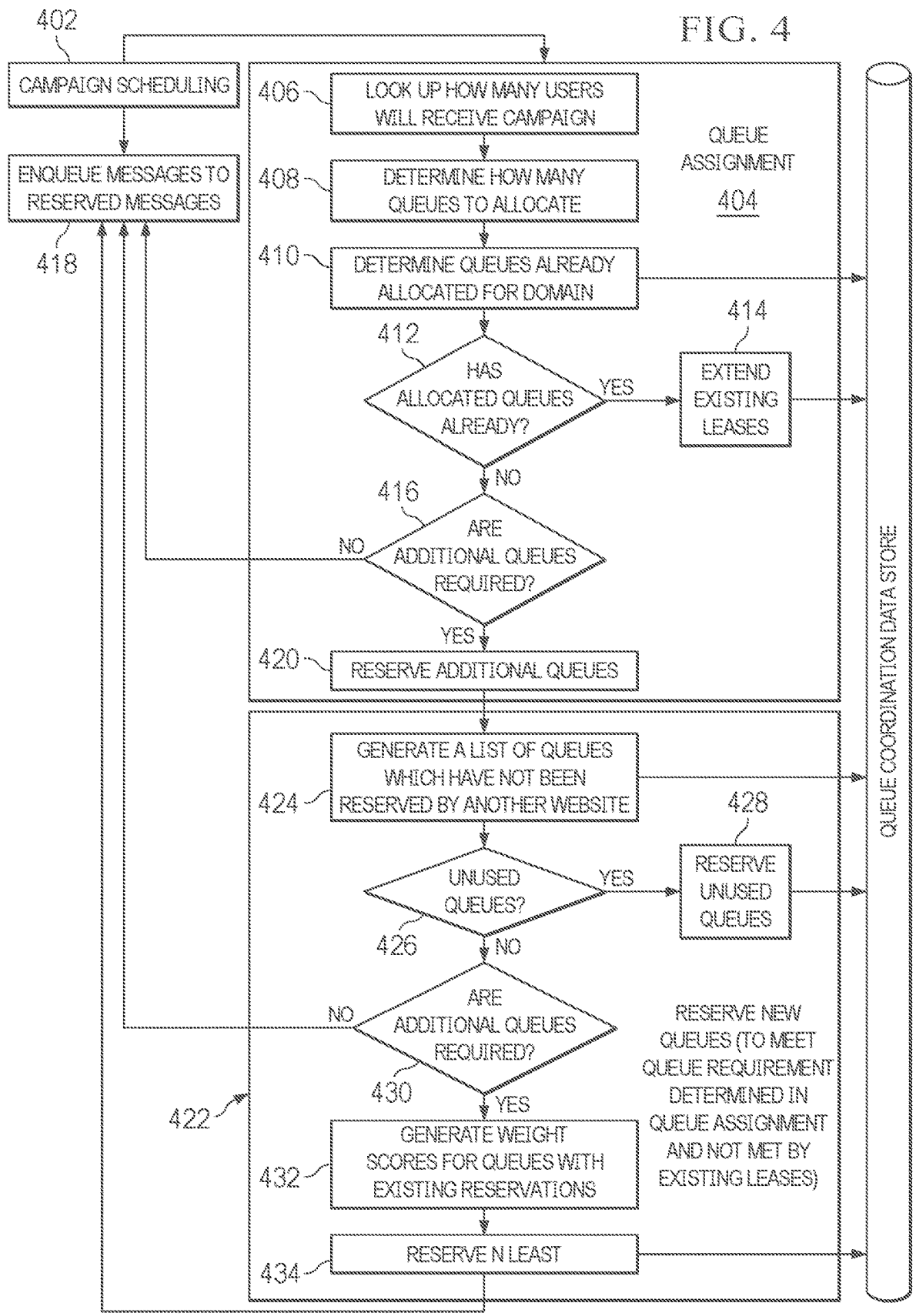
FIG. 4 is a flow diagram of an embodiment of a method for a producer in a messaging system.

Turning now to FIG. 4, one embodiment of a method for a campaign executor acting as a message producer in a messaging system utilizing a queue coordination data store is depicted. A campaign associated with a domain may be scheduled for execution and be executed by an executor (e.g., in a notification system) (STEP 402). A set of queues to utilize for the campaign may be determined (BLOCK 404). To determine the set of queues, a number of message queues to utilize for the campaign may first be determined. To determine the number of message queues, a workload associated with the campaign can be determined by determining a number of users associated with the domain corresponding to the campaign (STEP 406) and the number of queues determined based on this number of users (STEP 408). These users may, for example, be users who subscribed to notifications for that domain. The number of message queues to utilize for the campaign can then be determined based on the determined workload (e.g., by dividing the number of users by a configurable parameter. For example, if this parameter is 50,000 users the number of queues determined for a campaign for a domain having 100,000 users would be 2, for a domain having 110000 it would be 3 queues, etc. There may also be a configurable limit on the determined number of message queues for a campaign.

The data of the queue coordinating data store can then be accessed to determine if any message queues have been associated with (also referred to as reserved for) the domain associated with the campaign (STEP 410). If message queues have been reserved for that domain (Y Branch of STEP 412), that consumer reservation may be extended by resetting or adding time to the timer associated with that existing consumer reservation (e.g., the association between that message queue and that domain) (STEP 414). For example, when the queue coordination data store is an etcd data store, an etcd lease corresponding to that message queue and domain may be extended by adding time to the time to live associated with that etcd lease.

If the number of message queues that were already reserved in association with the campaign (e.g., the domain associated with the campaign) is equal or greater than the determined number of queues for that campaign (N Branch of STEP 416) the campaign executor may start producing messages in association with the campaign, and will place the messages produced in association with the campaign on the reserved message queues (STEP 418). If, however, the number of previously reserved message queues associated with the domain of the campaign is less than the determined number of message queues for the campaign (Y Branch of STEP 416), additional queues may be reserved (STEP 420). In particular, the additional message queues to be reserved may be new message queues that do not have an existing reservation in the queue coordination data store associated with the domain of the campaign (BLOCK 422).

Initially, a set of unused message queues that have not been reserved in association with any other domain may be determined from consumer reservation data in queue coordination data store (STEP 424). If there are unused message queues (Y Branch of STEP 426), these unused queues may be reserved to obtain the determined number of message queues for the campaign, if possible (e.g., such that the total number of previously reserved message queues and reserved unused queues is equal to the determined number of message queues) (STEP 428). To reserve an unused message queue, a consumer reservation for that message queue is stored in queue coordinating data store associating the domain of the campaign being executed with that message queue and the determined workload (or some portion of the determined workload for that message queue such as the total workload divided by the determined number of queues). The consumer reservation is also associated with a timer (e.g., a time to live in cases where the queue coordination data store is implemented using etcd and the consumer reservation is an etcd lease).

If the number of message queues that are now reserved in association with the campaign (e.g., the domain associated with the campaign) is equal or greater than the determined number of queues for that campaign (N Branch of STEP 430) the campaign executor may start producing messages in association with the campaign, and will place the messages produced in association with the campaign on the reserved message queues for that campaign (STEP 418). If, however, the number of reserved message queues associated with the (domain of the) campaign is less than the determined number of message queues for the campaign (Y Branch of STEP 430), additional queues to reserve may be determined.

Specifically, a workload weighting factor for message queues with existing consumer reservations (e.g., for domains other than the domain associated with the campaign) may be determined (STEP 432). This workload weighting factor for a message queue may be based on, for example, the total workload associated with that message queue in queue coordination data store (e.g., as determined from the workloads associated with each consumer reservation for that message queue in queue coordination data store), or the actual number of message in that message queue (e.g., as may be determined from a messaging system including that message queue). The set of message queues with existing reservations may then be ranked or ordered based on the associated workload weighting factor (e.g., from lowest utilization to highest utilization). A number (N) of these message queues with existing consumer reservations may be selected and reserved according to this ordering (e.g., lowest to highest utilization) until the determined number of message queues for that campaign has been reserved (STEP 434). Again, to reserve such a message queue, a consumer reservation for that message queue is stored in queue coordinating data store associating the domain of the campaign being executed with that message queue and the determined workload (or some portion of the determined workload for that message queue such as the total workload divided by the determined number of queues). The consumer reservation is also associated with a timer (e.g., a time to live in cases where the queue coordination data store is implemented using etcd and the consumer reservation is an etcd lease).

The campaign executor may then start producing messages in association with the campaign, and will place the messages produced in association with the campaign on the reserved message queues for that campaign (STEP 418). In one embodiment, the campaign executor may maintain a producer queue pool mapping an identifier for the execution of the campaign to identifiers of message queues reserved for the execution of the campaign. In this manner, as the campaign executor is producing messages it may access the mapping of campaigns to message queue identifiers and place produced messages on the identified message queues (e.g., in a round robin or some other manner.).

Figure 5:
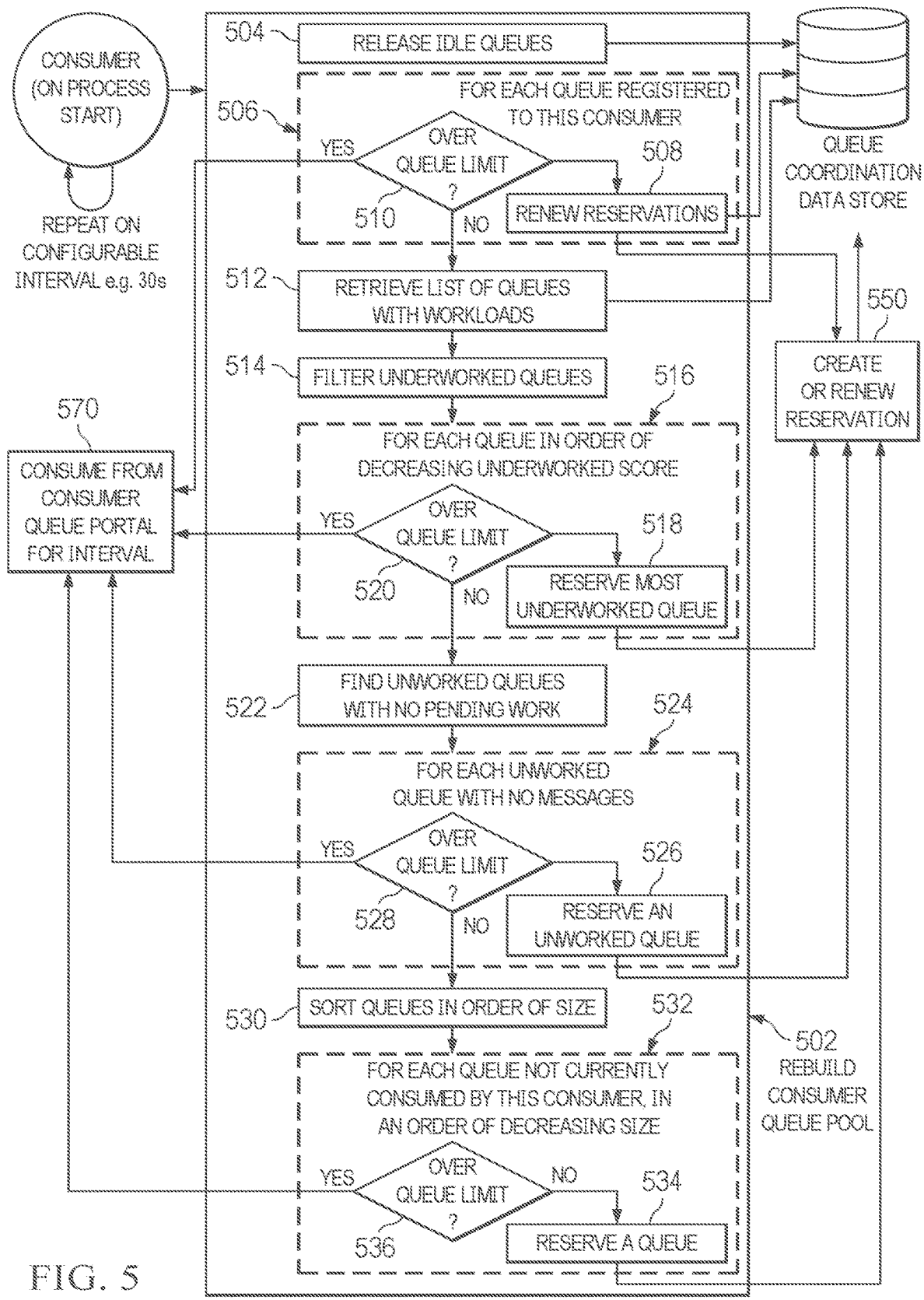
FIG. 5 is a flow diagram of an embodiment of a method for a consumer in a messaging system.

Referring now to FIG. 5, one embodiment of a method for a message consumer which consumes messages from message queues in a messaging system utilizing a queue coordination data store is depicted. In particular, embodiments of a message consumer determine or maintain (or can obtain information on) a consumer queue pool comprising a set of worked message queues which the message consumer has reserved and from which the message consumer is obtaining messages. The number of message queues in such a consumer queue pool may be at or under a queue limit which may be configurable or dynamically adjustable.

These worked message queues in the consumer queue pool may have a consumer reservation associated with them in the queue coordination data store. The consumer reservation may comprise an association between an identifier for the message consumer and the message queue. Such a consumer reservation may also have an associated (e.g., configurable) timer, such that on expiration of that timer that consumer reservation may expire and be removed from the queue coordination data store. For example, when the queue coordination data store is implemented using etcd, the consumer reservation may be an etcd lease association the identifier for the message consumer with the identifier for the message queue where the timer is a time to live for that etcd lease.

Accordingly, the message consumer may rebuild this consumer queue pool for the message consumer when the message consumer starts or at a particular interval (e.g., ten seconds, 30 seconds, etc.) (BLOCK 502). Such a queue rebuild interval and the time period for the timer (e.g., etcd lease) for a consumer reservation may be interrelated in some manner such that the consumer reservation timer length may be some multiple (e.g., twice) the time of the rebuild interval for the consumer queue pool to ensure that existing consumer reservations may be renewed.

In one embodiment, to rebuild the consumer queue pool, the message consumer may first release all currently worked message queues that are idle (STEP 504). An idle message queue may be a message queue that has been empty longer than some (e.g., configurable) idle time limit. Thus, the message consumer may access the consumer queue pool of the message consumer and, for each of the worked message queues listed in the consumer queue pool for the message consumer, determine if that identified message queue is empty and for how long that message queue has been idle. Such message queue data may be maintained at the queuing system that implements the message queue or may be, for example, determined from queue coordination data store based on (e.g., lack of) producer reservations associated with that message queue in the queue coordination data store. Alternatively, the message consumer may maintain a message queue idle timer based on a last time a message was obtained by the message consumer from that message queue. Such a message queue idle timer can be maintained, for example, in the consumer queue pool at the message consumer.

Thus, the message consumer may release message queues in the consumer queue pool of the message consumer that are determined to be idle (also referred to as unregistering the message consumer from the message queue). Such a release may also comprise deleting the association between the message consumer and that message queue in the queue coordination data store and removing that message queue (e.g., the identifier for that message queue) from the consumer queue pool of that message queue.

Once all idle message queues of the consumer queue pool are released, the message consumer may iterate through any remaining message queues of the consumer queue pool of the message consumer (e.g., the message queues of the consumer queue pool that were not determined to be idle) (BLOCK 506) and renew consumer reservations on the message queues (STEPS 508, 550). Such a renewal of the reservation may comprise resetting the timer of the consumer reservation comprising the association between that message consumer and that message queue such that the consumer reservation timer for that consumer reservation restarts (e.g., by resetting a time to leave associated with an etcd in embodiments where the queue coordination data store is implemented using etcd).

If the number of message queues in the consumer queue pool of the message consumer after the consumer reservations on existing (non-idle) queues of the consumer queue pool are renewed is over the queue limit (Y Branch of STEP 510), the message consumer can then begin obtaining message from the message queues identified in the consumer queue pool and processes the messages obtained from these message queues (e.g., during the rebuild interval) (STEP 570). If, however, the number of message queues in the consumer queue pool at this point is less than the queue limit (N Branch of STEP 510), additional queues to consume from may be determined by the worker agent.

Specifically, in one movement, underworked queues may be filtered from the set of message queues (e.g., that are not already in the consumer queue pool of the message consumer) by determining an underworked score for each message queue (e.g., message queues not currently identified in the consumer queue pool). To determine an underworked score the list of queues and their associated workloads (e.g., their total workload associated with all producer reservations for the message queue) may be obtained from the queue coordination data store (STEP 512). The underworked queues can be determined (filtered from the set of message queues) based on the underworked score (STEP 514). This underworked score may be based on the total workload associated with a message queue in queue coordination data store, the actual number of message in that message queue, or the number of message consumers associated with that message queue (e.g., the number of consumer reservations from other message consumers associated with that message queue in the queue coordination data store). Such an underworked score may be, for example, based on a standard deviation between the total workloads assigned to each of the message queues such that if a total workload or number of message in a message queue is more than a (configurable) number (e.g., 2) of standard deviations from an average total workload or number of messages the message queue is considered underworked.

The set of message queues may then be ranked or ordered based on the associated underworked score (e.g., such that the most underworked queues are ranked or ordered higher). The message consumer may then select and reserve these underworked message queues according to their ordering until the consumer queue pool comprises a number of message queues equal to the queue limit (BLOCK 516). In particular, the message consumer may select a highest ranked message queue based on the underworked score (e.g., the most underworked message queue), reserve that message queue by associating the message consumer and the selected message queue in the queue coordination data store (STEP 550), and add that selected message queue (e.g., identifier for that message queue) to the consumer queue pool of that message consumer (STEP 518). If the number of message queues in the consumer queue pool is still below the queue limit the next highest ranked message queue based on the underworked may be selected, reserved in the queue coordination data store, and added to the consumer queue pool. The addition and reservation of underworked message queues may continue in this manner until the queue limit is reached (Y Branch of STEP 520) or until the set of underworked queues is exhausted.

If the number of message queues in the consumer queue pool of the message consumer after underworked queues are reserved and added to the consumer queue pool is over the queue limit (Y Branch of STEP 520), the message consumer can then begin obtaining message from the message queues identified in the consumer queue pool and processes the messages obtained from these message queues (e.g., during the rebuild interval) (STEP 570).

In one embodiment, if the set of underworked queues is exhausted and the queue limit of queues in the consumer queue pool has still not been reached (N Branch of STEP 520), unworked queues of the set of message queues may be determined (STEP 522). These unworked queues may be message queues that have no producer reservations or that have no messages in the actual message queues. Thus, for example, the message consumer may access the queue coordination data store to determine message queues that do not have any producer reservations or have an indicator of having no associated workload. As message producers may target such unworked queues when making producer reservations it may be desirable for message consumers to add these queues to consumer queue pools in anticipation of those unworked queues soon having workload added to them.

Consequently, when unworked queues are determined, the message consumer may then select and reserve these unworked message queues until the consumer queue pool comprises a number of message queues equal to the queue limit (BLOCK 524). In particular, the worker agent may select a unworked queue (e.g., randomly from the set of unworked queues) reserve that unworked message queue by associating the message consumer and the selected message queue in the queue coordination data store along with a timer (STEPS 526, 550), and add that selected message queue (e.g., identifier for that message queue) to the consumer queue pool of that message consumer. If the number of message queues in the consumer queue pool is still below the queue limit a next unworked message queue may be selected (e.g., at random), reserved in the queue coordination data store, and added to the consumer queue pool. The addition and reservation of unworked message queues may continue in this manner until the queue limit is reached (Y Branch of STEP 528) or until the set of underworked queues is exhausted.

If the number of message queues in the consumer queue pool of the message consumer after unworked queues are reserved and added to the consumer queue pool is over the queue limit (Y Branch of STEP 528), the message consumer can then begin obtaining message from the message queues identified in the consumer queue pool and processes the messages obtained from these message queues (e.g., during the rebuild interval) (STEP 570). If, however, the number of message queues in the consumer queue pool at this point is less than the queue limit, additional queues to consume from may be determined by the message consumer.

Specifically, if the set of unworked queues is exhausted and the queue limit of queues in the consumer queue pool has still not been reached (N Branch of STEP 528), the extra capacity of the message consumer may be utilized to consume messages from the largest existing queues. In particular, according to one embodiment, the remaining set of message queues (e.g., the set of messages queues not already in the consumer queue pool of the message consumer) may be sorted or ranked in order of size as determined from that total workload associated with the message queue or actual number of messages in the message queues (STEP 530). For example, the message consumer may obtain the number of messages in each remaining message queue or the total workload of each of the remaining set of message queues may be obtained from the queue coordination data store (e.g., the total workload as determined from all producer reservations associated with the queue). The set of remaining message queues can then be ordered based on the size of the associated total workload or the number of messages of each message queue, with the largest message queues (e.g., with the highest workload or number of messages) ranked highest.

The message consumer may then select and reserve these remaining message queues according to their size ordering until the consumer queue pool comprises a number of message queues equal to the queue limit (BLOCK 532). In particular, the message consumer may select a highest ranked message queue based on the size ranking, reserve that message queue by associating the message consumer and the selected message queue in the queue coordination data store along with a timer (STEPS 534, 550), and add that selected message queue (e.g., identifier for that message queue) to the consumer queue pool of that message consumer. If the number of message queues in the consumer queue pool is still below the queue limit (No Branch of STEP 536) the next highest ranked message queue based on the underworked may be selected, reserved in the queue coordination data store (STEPS 534, 550), and added to the consumer queue pool. The addition and reservation of these remaining message queues may continue in this manner until the queue limit is reached or until the set of message queues is exhausted. At this point, the message consumer can then begin obtaining messages from the message queues identified in the consumer queue pool for that message consumer and processes the messages obtained from these message queues (STEP 570).

The invention and the various features and advantageous details thereof are explained fully with reference to the nonlimiting embodiments that are illustrated in the accompanying drawings and detailed in the description as included. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such an embodiment, feature, or function). Rather, the description is intended to describe illustrative embodiments, features, and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Reference throughout this specification to "one embodiment," "an embodiment," or "a specific embodiment," "a specific implementation," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Data may be stored in a single storage medium or distributed through multiple storage mediums, and may reside in a single database or multiple databases (or other data storage techniques.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system, comprising:
a processor;
a memory including a queue coordination data store; and
a non-transitory computer readable medium storing instructions for:
a message producer adapted to execute a campaign by:
determining a workload associated with the campaign;
determining a number of queues for the campaign;
reserving a first set of message queues for the campaign in the queue coordination data store, wherein the first set of message queues comprise the determined number of message queues for the campaign and the first set of message queues are reserved by creating a producer reservation in the queue coordination data store for each message queue of the first set of message queues, the producer reservation for a message queue of the first set of message queues comprising an association between an aspect of the campaign, an identifier for the message queue, and the workload;
producing messages associated with the campaign to the first set of message queues;
a message consumer adapted to consume messages from message queues of a messaging system by:
determining a consumer queue pool at an interval based on workloads associated with producer reservations in the queue coordination data store, wherein the consumer queue pool comprises a second set of the message queues of the messaging system;
reserving the second set of message queues by creating a consumer reservation in the queue coordination data store for each message queue of the second set of message queues, the consumer reservation for a message queue of the second set of message queues comprising an association between an identifier for the message consumer and the identifier for the message queue; and
reading messages from the second set of message queues.

2. The system of claim 1, wherein the campaign aspect is a domain associated with the campaign.

3. The system of claim 2, wherein the first set of message queues includes at least one message queue with an existing producer reservation associated with the domain.

4. The system of claim 3, wherein the number of queues is based on the workload.

5. The system of claim 2, wherein the workload is based on a number of users associated with the domain.

6. The system of claim 1, wherein each consumer reservation is associated with a timer.

7. The system of claim 6, wherein the queue coordination data store is an etcd data store and each consumer reservation is an etcd lease.

8. A method, comprising:
at a message producer adapted to execute a campaign:
determining a workload associated with the campaign;
determining a number of queues for the campaign;
reserving a first set of message queues for the campaign in the queue coordination data store, wherein the first set of message queues comprise the determined number of message queues for the campaign and the first set of message queues are reserved by creating a producer reservation in the queue coordination data store for each message queue of the first set of message queues, the producer reservation for a message queue of the first set of message queues comprising an association between an aspect of the campaign, an identifier for the message queue, and the workload;

producing messages associated with the campaign to the first set of message queues;

at a message consumer adapted to consume messages from message queues of a messaging system:

determining a consumer queue pool at an interval based on workloads associated with producer reservations in the queue coordination data store, wherein the consumer queue pool comprises a second set of the message queues of the messaging system;

reserving the second set of message queues by creating a consumer reservation in the queue coordination data store for each message queue of the second set of message queues, the consumer reservation for a message queue of the second set of message queues comprising an association between an identifier for the message consumer and the identifier for the message queue; and reading messages from the second set of message queues.

9. The method of claim 8, wherein the campaign aspect is a domain associated with the campaign.

10. The method of claim 9, wherein the first set of message queues includes at least one message queue with an existing producer reservation associated with the domain.

11. The method of claim 10, wherein the number of queues is based on the workload.

12. The method of claim 9, wherein the workload is based on a number of users associated with the domain.

13. The method of claim 8, wherein each consumer reservation is associated with a timer.

14. The method of claim 13, wherein the queue coordination data store is an etcd data store and each consumer reservation is an etcd lease.

15. A non-transitory computer readable medium, storing instructions for:

at a message producer adapted to execute a campaign:

determining a workload associated with the campaign;

determining a number of queues for the campaign;

reserving a first set of message queues for the campaign in the queue coordination data store, wherein the first set of message queues comprise the determined number of message queues for the campaign and the first set of message queues are reserved by creating a producer reservation in the queue coordination data store for each message queue of the first set of message queues, the producer reservation for a message queue of the first set of message queues comprising an association between an aspect of the campaign, an identifier for the message queue, and the workload;

producing messages associated with the campaign to the first set of message queues;

at a message consumer adapted to consume messages from message queues of a messaging system:

determining a consumer queue pool at an interval based on workloads associated with producer reservations in the queue coordination data store, wherein the consumer queue pool comprises a second set of the message queues of the messaging system;

reserving the second set of message queues by creating a consumer reservation in the queue coordination data store for each message queue of the second set of message queues, the consumer reservation for a message queue of the second set of message queues comprising an association between an identifier for the message consumer and the identifier for the message queue; and reading messages from the second set of message queues.

16. The non-transitory computer readable medium of claim 15, wherein the campaign aspect is a domain associated with the campaign.

17. The non-transitory computer readable medium of claim 16, wherein the first set of message queues includes at least one message queue with an existing producer reservation associated with the domain.

18. The non-transitory computer readable medium of claim 17, wherein the number of queues is based on the workload.

19. The non-transitory computer readable medium of claim 16, wherein the workload is based on a number of users associated with the domain.

20. The non-transitory computer readable medium of claim 15, wherein each consumer reservation is associated with a timer.

21. The non-transitory computer readable medium of claim 20, wherein the queue coordination data store is an etcd data store and each consumer reservation is an etcd lease.

* * * * *